(12) United States Patent
Baheti et al.

(10) Patent No.: US 11,828,835 B2
(45) Date of Patent: Nov. 28, 2023

(54) RADIO FREQUENCY SYSTEMS INTEGRATED WITH DISPLAYS AND METHODS OF FORMATION THEREOF

(71) Applicant: Infineon Technologies AG, Neubiberg (DE)

(72) Inventors: Ashutosh Baheti, Munich (DE); Saverio Trotta, Munich (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 390 days.

(21) Appl. No.: 16/991,568

(22) Filed: Aug. 12, 2020

(65) Prior Publication Data
US 2020/0371223 A1  Nov. 26, 2020

Related U.S. Application Data

(63) Continuation of application No. 15/782,288, filed on Oct. 12, 2017, now Pat. No. 10,775,490.

(51) Int. Cl.
*G01S 13/34* (2006.01)
*H01Q 1/40* (2006.01)
*H01Q 1/22* (2006.01)
*G01S 7/02* (2006.01)
(Continued)

(52) U.S. Cl.
CPC ............. *G01S 13/34* (2013.01); *G01S 7/02* (2013.01); *G01S 7/04* (2013.01); *G01S 13/44* (2013.01);
(Continued)

(58) Field of Classification Search
CPC ............ H01Q 1/243; H01Q 1/38; H01Q 1/24; H01Q 7/06; H01Q 1/2283; H01Q 21/28; H01Q 1/36; H01Q 1/242; H01Q 1/44; H01Q 1/2266; H01Q 21/06; H01Q 1/40; H01Q 9/045; H01Q 9/0457; H01Q 21/065;
(Continued)

(56) References Cited

U.S. PATENT DOCUMENTS 6,882,858 B1 * 4/2005 Hosonuma ........... H05K 9/0039
                                                                            455/333
8,851,390 B2    10/2014 Ikemoto
(Continued)

FOREIGN PATENT DOCUMENTS

CN       103247581 A    8/2013
KR    20080063212 A    7/2008

*Primary Examiner* — Olumide Ajibade Akonai
(74) *Attorney, Agent, or Firm* — Slater Matsil, LLP

(57) ABSTRACT

A radio frequency (RF) device includes a display screen and a flexible substrate. The display screen is configured to transmit visible light at a first side of the display screen. The flexible substrate includes a first portion overlapping the first side, and a second portion overlapping an opposite second side of the display screen. The RF device further includes a plurality of antennas disposed over the first portion of the flexible substrate and the first side, and a transmission line disposed on a bent region of the flexible substrate between the first and second portions. The plurality of antennas is configured to transmit/receive RF signals on the first side of the display screen. The display screen is opaque to the RF signals. The transmission line is configured to propagate the RF signals between the first portion and the second portion on the opposite second side of the display screen.

22 Claims, 12 Drawing Sheets

(51) Int. Cl.
| | |
|---|---|
| *H01Q 1/38* | (2006.01) |
| *G01S 13/44* | (2006.01) |
| *H01Q 9/04* | (2006.01) |
| *H01Q 1/02* | (2006.01) |
| *G01S 7/04* | (2006.01) |
| *G01S 13/88* | (2006.01) |
| *H01Q 21/06* | (2006.01) |
| *G01S 7/35* | (2006.01) |
| *G01S 13/02* | (2006.01) |
| *H01Q 1/24* | (2006.01) |

(52) U.S. Cl.
CPC ........... *G01S 13/88* (2013.01); *H01Q 1/2283* (2013.01); *H01Q 1/243* (2013.01); *H01Q 1/38* (2013.01); *H01Q 1/40* (2013.01); *H01Q 9/045* (2013.01); *H01Q 9/0457* (2013.01); *G01S 7/027* (2021.05); *G01S 7/352* (2013.01); *G01S 7/356* (2021.05); *G01S 2013/0245* (2013.01); *H01Q 21/065* (2013.01)

(58) Field of Classification Search
CPC ......... H01Q 1/2258; G01S 7/027; G01S 7/04; G01S 13/34; G01S 7/02; G01S 13/44; G01S 13/88; G01S 7/352; G01S 7/356; G01S 2013/0245; G06F 3/0443; G06F 3/0412; G06F 3/0446; G06F 2203/04103; G06F 1/1637; G06F 3/017; G06F 1/1698; G02F 1/13338; G02F 1/13454
See application file for complete search history.

(56) References Cited

U.S. PATENT DOCUMENTS

| | | | |
|---|---|---|---|
| 9,614,168 B2* | 4/2017 | Zhang | H01L 27/3276 |
| 9,818,974 B2 | 11/2017 | Kwon et al. | |
| 10,910,718 B2* | 2/2021 | Yashiro | H01Q 1/40 |
| 2007/0103311 A1 | 5/2007 | Kippelen et al. | |
| 2007/0171241 A1* | 7/2007 | Kimura | G09G 3/2029 345/690 |
| 2008/0158094 A1 | 7/2008 | Rofougaran | |
| 2008/0213984 A1* | 9/2008 | Moriwaka | H01L 27/1285 257/E29.004 |
| 2008/0297466 A1* | 12/2008 | Kunimori | G09G 3/3406 349/116 |
| 2012/0019419 A1* | 1/2012 | Prat | H01Q 13/106 343/702 |
| 2012/0092284 A1 | 4/2012 | Rofougaran et al. | |
| 2013/0162124 A1 | 6/2013 | Miyaoka et al. | |
| 2013/0207274 A1 | 8/2013 | Liu et al. | |
| 2013/0270562 A1* | 10/2013 | Yamazaki | H01L 23/60 438/585 |
| 2014/0055702 A1 | 2/2014 | Park et al. | |
| 2014/0092034 A1* | 4/2014 | Franklin | H05K 1/028 345/173 |
| 2014/0104157 A1* | 4/2014 | Burns | H01Q 1/243 343/702 |
| 2014/0106684 A1* | 4/2014 | Burns | H01Q 21/28 29/601 |
| 2014/0111953 A1 | 4/2014 | Mcclure et al. | |
| 2015/0125596 A1 | 5/2015 | Ramakrishnan et al. | |
| 2015/0153594 A1* | 6/2015 | Sato | G02F 1/1333 349/122 |
| 2015/0380848 A1 | 12/2015 | Kato | |
| 2016/0093939 A1 | 3/2016 | Kim et al. | |
| 2016/0093943 A1 | 3/2016 | Yang et al. | |
| 2016/0308563 A1 | 10/2016 | Ouyang et al. | |
| 2017/0207516 A1 | 7/2017 | Koo et al. | |
| 2018/0062263 A1 | 3/2018 | Ueda | |
| 2018/0088380 A1* | 3/2018 | Oka | G02F 1/13452 |
| 2019/0067797 A1* | 2/2019 | Jung | H04M 1/026 |
| 2019/0113609 A1 | 4/2019 | Baheti et al. | |

* cited by examiner

RADIO FREQUENCY SYSTEMS INTEGRATED WITH DISPLAYS AND METHODS OF FORMATION THEREOF

This application is a continuation of U.S. patent application Ser. No. 15/782,288, filed on Oct. 12, 2017, which application is hereby incorporated herein by reference in its entirety.

TECHNICAL FIELD

The present invention relates generally to a radio frequency system, and, in particular embodiments, to structures of radio frequency systems integrated with displays, methods of formation, and methods of operation thereof.

BACKGROUND

Portable devices such as tablets, smart phones, and smart watches have become popular recently due to the rapid advancement in low-cost semiconductor technologies. Portable devices as well as other electronic devices may incorporate antenna elements for radio frequency (RF) communication as well as for radar applications such as object ranging, tracking, and identification. In some applications, multiple antenna elements may be utilized for beamforming, transmit diversity and multiple input, multiple output (MIMO) configurations, and also as radar sensors that can detect user motions (known as gesture sensors).

As portable devices become smaller and device functionality is expanded, it may be difficult to fit additional antennas within the device casing while still provided desired functionality. For example, many applications of radar functionality may be useful in the region in front of the display screen of a tablet, smart phone, smart watch, or other electronic device. However, signals sent and received by a radar system may not be able to penetrate the display screen of the device. Therefore, portable devices which incorporate a radar system that is capable of operating in the region in front of a display screen of the portable device may be desirable.

SUMMARY

In accordance with an embodiment of the invention, a radio frequency (RF) system includes a flexible substrate that includes a first portion and a second portion. The first portion overlaps a first surface of a substrate. The first surface is on a first side of the RF system. The second portion overlaps a second surface of the substrate. The second surface is on a second side of the RF system. The RF system further includes an antenna disposed over the first portion of the flexible substrate. The antenna is configured to transmit/receive RF signals on the first side of the RF system. The RF system also includes a transmission line disposed on a bent region of the flexible substrate between the first portion and the second portion. The transmission line is configured to propagate the RF signals between the first portion and the second portion on the second side of the RF system.

In accordance with another embodiment of the invention, a method of fabricating an RF system includes forming an antenna overlapping a first portion of a flexible substrate, forming a transmission line on a middle region of the flexible substrate between the first portion and a second portion of the flexible substrate, attaching the first portion to a first surface of a substrate, bending the middle region of the flexible substrate to form a bent region of the flexible substrate, and attaching the second portion to a second surface of the substrate. The antenna is configured to transmit/receive RF signals at the first surface. The transmission line is configured to propagate the RF signals between the first portion and the second portion at the second surface of the substrate.

In accordance with still another embodiment of the invention, an RF device includes an opaque substrate that includes a first surface and a second surface. The RF device also includes a first substrate disposed over the first surface and a transparent substrate disposed over the first substrate. The RF device further includes a first antenna integrated with the transparent substrate. The first antenna is configured to transmit/receive RF signals. The RF device also includes an integrated circuit (IC) chip comprising RF circuitry configured to process the RF signals. The IC chip is operatively coupled to the first antenna through an integrated region within the transparent substrate. The RF device further includes a second substrate disposed over the second surface. The second substrate includes electronic circuitry. The RF device also includes a flexible connector attached to the first substrate and the second substrate. The flexible connector is operatively coupled to the IC chip and to the electronic circuitry. The first antenna communicates with the electronic circuitry through the IC chip using the flexible connector.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Portable devices may utilize antenna elements for beamforming, transmit diversity and MIMO configurations, and as radar sensors that can detect user motions (known as gesture sensors). Gesture sensors may be configured in a portable device as an interface to control functionality of the device as well as to gather information about objects in the area around the portable device.

In various embodiments, a radar-based gesture detection system is used to directly control a device such as a computer, a smartphone, or a tablet computer, or to control a remote device such as a vehicle, an electronic system within a building, or a home appliance. For example, when the remote device is a car, an embodiment gesture detection system allows a human actor to control various operations of the car from outside the car.

Figure 1A:
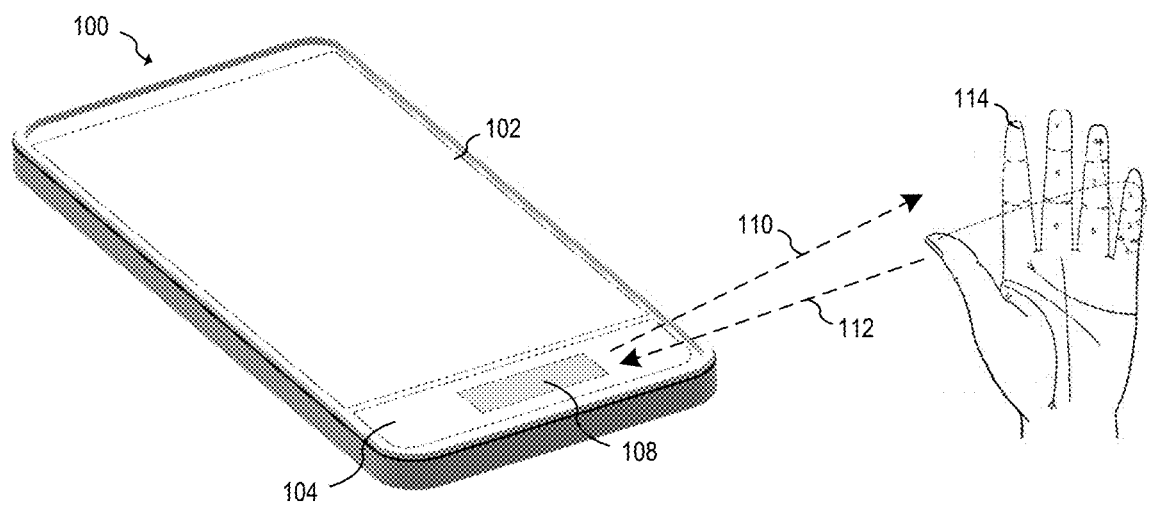
FIG. 1A illustrates an example radio frequency (RF) system application in which a portable device is controlled using various hand gestures.

FIG. 1A illustrates an example radio frequency (RF) system application in which a portable device 100 is controlled using various hand gestures. As shown, portable device 100 may be a smart phone and includes a display element 102 physically coupled to a sensor region 104. During operation, sensor region 104 transmits RF signals 110 to target 114, which may be a human hand, and receives reflected RF signals 112 that are reflected by target 114. These reflected RF signals 112 are processed by the radar system to determine the position and motion of target 114 and/or to determine whether target 114 is providing a particular gesture. In some embodiments, sensor region 104 may include a radar system circuit 108 that is disposed within a sensor region 104. At least a portion of sensor region 104 is transparent or partially transparent to RF signals transmitted and received by radar system circuit 108. It should be appreciated that radar system circuit 108 may also be disposed within the boundaries of display element 102.

In alternative embodiments, radar system circuit 108 may be embedded within other devices including, but not limited to, car keys, smart watches, tablet computers, audio/visual equipment, kitchen appliances, heating, ventilation, and air conditioning (HVAC) controls, and automobiles. In some applications, such as automotive applications, radar system circuit 108 may be embedded within a mobile device such as a car key, smart watch, or smart phone, which in turn communicates with a remote device to be controlled, such as an automobile or kitchen appliance. The data transfer between the mobile device and remote device could include any of a wide variety of communications technologies, including, e.g., Bluetooth, vehicle-to-everything (V2X), etc.

Figure 1B:
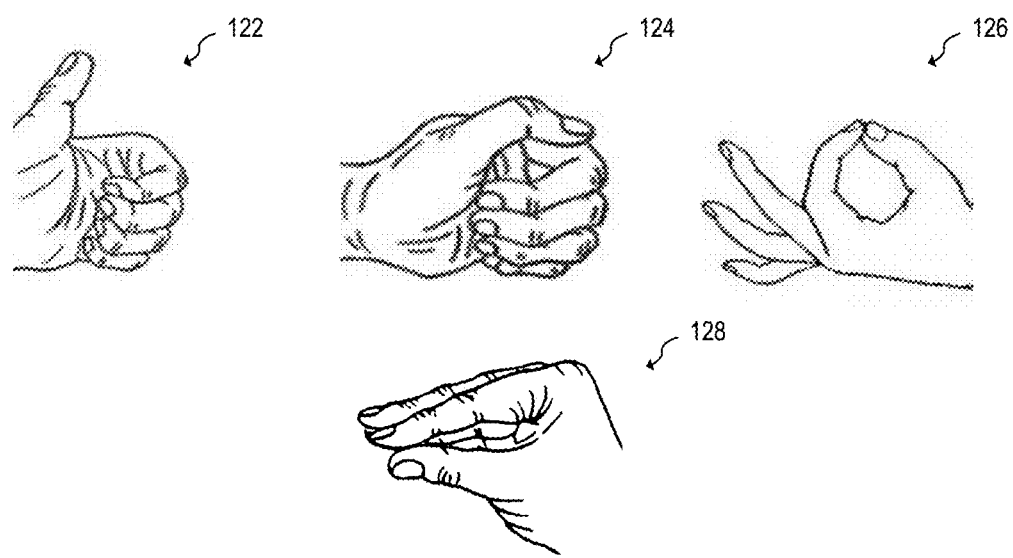
FIG. 1B illustrates various example hand gestures that may be used to control a portable device.

Example hand gestures shown in FIG. 1B may include, for example, a "thumbs-up" gesture 122, a "closed fist" gesture 124, a "thumb-to-finger" gesture 126, or a "button press" gesture 128. Each of these example gestures could be used to control the functionality of portable device 100 or some other device or system. For example, "thumbs-up" gesture 122 could be used to open a portable device application, "closed fist" gesture 124 could be used to close the portable device application, "thumb-to-finger" gesture 126 in conjunction with motion between the thumb and index finger may be used to virtually rotate the images on the display of portable device 100, and "button press" gesture 128 could be used to start and stop a stopwatch feature of portable device 100. In various embodiments, recognized gestures may be static or dynamic. Static gestures may be made by holding a hand in a fixed position such as the gestures 122, 124 and 128, and dynamic gestures may be made by moving the hand or a portion of the hand, such as moving the index finger with respect to the thumb such as with gesture 126. It should be understood that the above-mentioned gestures are just a few examples of many possible gestures that may be recognized by embodiment radar systems.

Figure 1C:
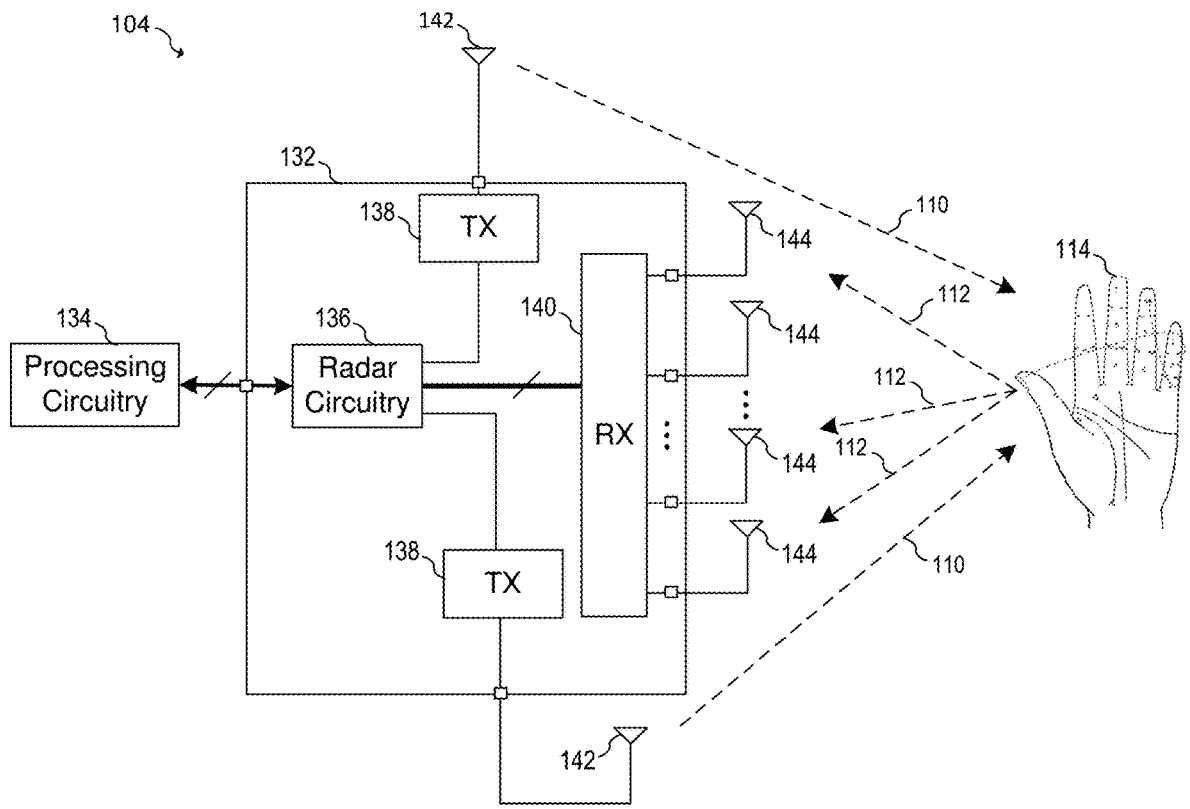
FIG. 1C illustrates a block diagram of a sensor region that includes an RF front end circuit and processing circuitry.

FIG. 1C illustrates a block diagram of sensor region 104 that includes radar front-end circuit 132 and processing circuitry 134. During operation, positions and gestures of target 114 may be detected by the sensor region 104. For example, a gesture of two fingers tapping each other could be interpreted as a "button press," or a gesture of a rotating thumb and finger may be interpreted as turning a dial. While target 114 is depicted in FIG. 1C as being a hand, sensor region 104 may also be configured to determine gestures and positions of other types of targets such as a human body, machinery and other types of animate or inanimate objects. Sensor region 104 may be implemented, for example, using a two-dimensional millimeter-wave (MMW) phase-array radar that measures the position and relative speed of target 114. The MMW phase-array radar transmits and receives signals in the 50 GHz to 80 GHz range. Alternatively, frequencies outside of this range may also be used. In some embodiments, radar front-end circuit 132 operates as a frequency modulated continuous wave (FMCW) radar sensor having multiple transmit and receive channels.

Radar front-end circuit 132 transmits and receives radio signals for detecting target 114 in three-dimensional space. For example, radar front-end circuit 132 transmits an incident RF signal and receives a RF signal that is a reflection of the incident RF signal from target 114. The received reflected RF signal is downconverted by radar front-end circuit 132 to determine beat frequency signals. These beat frequency signals may be used to determine information such as the location, speed, angle, etc., of target 114 in three-dimensional space.

In various embodiments, radar front-end circuit 132 is configured to transmit incident RF signals toward target 114 via transmit antennas 142 and to receive reflected RF signals from target 114 via receive antennas 144. Radar front-end circuit 132 includes transmitter front-end circuits 138 coupled to transmit antennas 142 and receiver front-end circuit 140 coupled to receive antennas 144.

During operation, transmitter front-end circuits 138 may transmit RF signals toward target 114 one at a time or simultaneously. While two transmitter front-end circuits 138 are depicted in FIG. 1C, it should be appreciated that radar front-end circuit 132 may include fewer or greater than two transmitter front-end circuits 138. Each transmitter front-end circuit 138 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 140 receives and processes the reflected RF signals from target 114. As shown in FIG. 1C, receiver front-end circuit 140 is configured to be coupled to four receive antennas 144, which may be configured as a 2×2 antenna array. In alternative embodiments, receiver front-end circuit 140 may be configured to be coupled to greater or fewer than four antennas, with the resulting antenna array being of various n×m dimensions depending on the specific embodiment and its specifications. Receiver front-end circuit 140 may include, for example, RF oscillators, upconverting mixers, RF amplifiers, variable gain amplifiers, filters, transformers, power combiners and other types of circuits.

Radar circuitry 136 provides signals to be transmitted to transmitter front-end circuits 138, receives signals from receiver front-end circuit 140, and may be configured to control the operation of radar front-end circuit 132. In some embodiments, radar circuitry 136 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 136 may receive a baseband radar signal from processing circuitry 134 and control a frequency of an RF oscillator based on the received baseband signal. In some embodiments, this received baseband signal may represent a FMCW frequency chip to be transmitted. Radar circuitry 136 may adjust the frequency of the RF oscillator by applying a signal proportional to the received baseband signal to a frequency control input of a phase locked loop. Alternatively, the baseband signal received from processing circuitry 134 may be upconverted using one or more mixers. Radar circuitry 136 may transmit and digitize baseband signals via a digital bus (e.g., a USB bus), transmit and receive analog signals via an analog signal path, and/or transmit and/or receive a combination of analog and digital signals to and from processing circuitry 134.

Processing circuitry 134 acquires baseband signals provided by radar circuitry 136 and performs one or more signal processing steps to evaluate them. In an embodiment, processing circuitry 134 acquires a baseband signal that represents the beat frequency signals. The signal processing steps may include performing a fast Fourier transform (FFT), a short-time Fourier transform (STFT), target classification, machine learning, and the like. Results of the signal processing steps are used to determine and perform an action on the device, such as portable device 100 of FIG. 1A. In addition to processing the acquired baseband signals, processing circuitry 134 may also control aspects of radar front-end circuit 132, such as the transmissions produced by radar front-end circuit 132.

The various components of sensor region 104 may be partitioned in various ways. For example, radar front-end circuit 132 may be implemented on one or more RF integrated circuits (RFICs), antennas 142 and 144 may be disposed on a circuit board, and processing circuitry 134 may be implemented using a processor, a microprocessor, a digital signal processor and/or a custom logic circuit disposed on one or more integrated circuits/semiconductor substrates. Processing circuitry 134 may include a processor that executes instructions stored in a non-transitory memory to perform the functions of processing circuitry 134. In some embodiments, however, all or part of the functionality of processing circuitry 134 may be incorporated on the same integrated circuit/semiconductor substrate on which radar front-end circuit 132 is disposed.

In some embodiments, some or all portions of radar front-end circuit 132 may be implemented in a package that contains transmit antennas 142, receive antennas 144, transmitter front-end circuits 138, receiver front-end circuit 140, and/or radar circuitry 136. In some embodiments, radar front-end circuit 132 may be implemented as one or more integrated circuits disposed on a circuit board, and transmit antennas 142 and receive antennas 144 may be implemented on the circuit board adjacent to the integrated circuits. In some embodiments, transmitter front-end circuits 138, receiver front-end circuit 140, and radar circuitry 136 are formed on a same radar front-end integrated circuit (IC) die. Transmit antennas 142 and receive antennas 144 may be part of the radar front-end IC die, or may be separate antennas over or adjacent to the radar front-end IC die. The radar front-end IC die may further include conductive layers, such as redistribution layers (RDLs), used for routing and/or for the implementation of various passive or active devices of radar front-end circuit 132. In an embodiment, transmit antennas 142 and receive antennas 144 may be implemented using the RDLs of the radar front-end IC die.

Figure 1D:
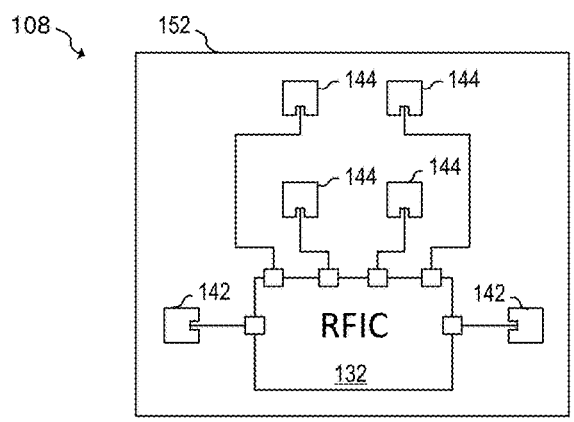
FIG. 1D illustrates a plan view of a radar system circuit that includes a RF front end circuit implemented as a radio frequency integrated circuit (RFIC)

FIG. 1D illustrates a plan view of radar system circuit 108 that includes radar front-end circuit 132 implemented as an RFIC coupled to transmit antennas 142 and receive antennas 144 implemented as patch antennas disposed on or within substrate 152. In some embodiments, substrate 152 may be implemented using a circuit board on which radar front-end circuit 132 is disposed and on which transmit antennas 142 and receive antennas 144 are implemented using conductive layers of the circuit board. Alternatively, substrate 152 represents a wafer substrate on which one or more RDLs are disposed and on which transmit antennas 142 and receive antennas 144 are implemented using conductive layers on the one or more RDLs. It should be appreciated that the implementation of FIG. 1D is just one of many ways that embodiment radar systems may be implemented.

In various applications, an electronic device may benefit from RF functionality such as radar functionality on one side of a device coupled to electronic circuitry located on a printed circuit board (PCB) on a second side of the device. For example, a mobile phone may include a display such as a liquid crystal display (LCD) screen which displays an image at a front side of the device where RF functionality may be also be desired.

Various layers such as LCD screens may be opaque to radio frequency signals (RF-opaque). Consequently, it may be desirable to integrate RF systems with the displays of electronic devices in order to improve device functionality while reducing device size. Typical sensors may not be able to penetrate LCD screens. For example, an LCD screen may include an LCD stack containing a combination of transparent layers and RF-opaque layers such as polarizing filters, glass layers, liquid crystal layers, and reflector layers. As one specific example, MMW radar sensors may be unable to penetrate a metal reflector layer that is included in many LCD stacks. Other examples of an intervening RF-opaque layer may be a touch-sensing layer or a ground plane in an electronic device.

A bezel including RF antennas may be included to allow transmission and reception of RF signals on the same side of the device as an LCD screen. However, a bezel may increase the size of the screen and therefore limit the compactness of the device. It may then be desirable to reduce the overall size of electronic devices such as mobile phones, tablet computers, laptop computers, computer monitors, televisions, vehicles, smartwatches, Internet of Things (IoT) device, etc. by improving integration of RF antennas with the LCD screen.

In various embodiments, an RF system includes an antenna located on a first side of a substrate coupled to circuitry on a second side of the substrate. For example, the first and second surfaces of the substrate may be opposing surfaces. As another example, the first and second surfaces may form a substantially 90° angle with one another. The antenna is operatively coupled to the circuitry using a flexible means such as a flexible substrate including a transmission line such as a flexible printed circuit (FPC) or a flexible connector such as a flat flexible cable (FFC). The flexible means is bent such that a first portion of the flexible means overlaps a first surface on the first side of the substrate and a second portion of the flexible means overlaps a second surface on the second side of the substrate.

The antenna is configured to transmit and/or receive RF signals on the first side of the substrate. The substrate may include an RF-opaque layer such as a reflective layer in an LCD screen. The circuitry on the second side of the substrate may be located on a PCB. For example, the PCB may be the primary PCB of a mobile phone or a tablet computer. RF signals and/or control signals may be sent from the first side to the second side using the flexible means.

The RF system may advantageously enable a transparent layer such as a glass layer of an LCD screen to incorporate antenna functionality. For example, antennas may be located on interior or exterior surfaces of the glass layer as well as integrated within the glass layer. System extension may be possible through integration of some or all of the RF functionality into a transparent substrate. In some configurations, the transparent substrate may be configured to improve performance of the antenna by increasing gain or shaping the radiation pattern of the antenna to better suit a particular application.

Another possible benefit of the RF system is the efficient use of space in an electronic device that may be afforded by integrating RF functionality with an LCD screen. For example, an antenna may be integrated with an LCD screen at the front of an electronic device and coupled to an IC chip located on the back of the electronic device using a flexible substrate. The flexible substrate may be made thin and bent so that it is in close proximity to a side surface of the LCD stack of the LCD screen. In this way, the overall size of the electronic device may be advantageously reduced by decreasing the size of the bezel of the LCD screen while enabling RF functionality such as gesture control, ranging of objects, identification of objects, and motion tracking at the screen side of an electronic device.

Embodiments provided below describe various structures and methods of forming an RF system, and in particular, RF systems that are integrated with display regions of an electronic device. The following description describes the embodiments. Various embodiment RF systems including a flexible substrate are described using FIGS. 2-5 and 6A-6C.

Several embodiment RF systems including a flexible connector and an integrated region are described using FIGS. 7, 8, 9A, and 9B. Two embodiment RF systems including antennas integrated with a transparent substrate are described using FIGS. 10 and 11. Four embodiment antennas are described using FIGS. 12-15. Various embodiment RF systems including antennas located above an LCD screen are described using FIGS. 16-20. An embodiment method of forming an RF system is described using FIG. 21.

Figure 2:
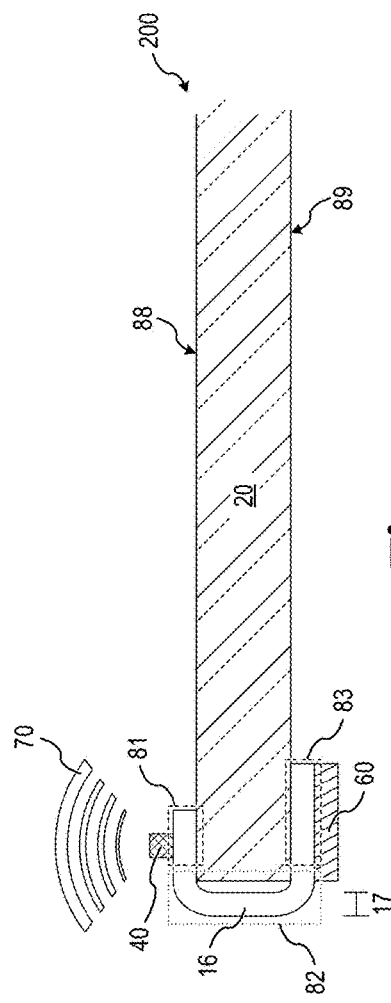
FIG. 2 illustrates a cross-sectional view of an example RF system including a layer that is opaque to RF signals (RF-opaque layer), one or more antennas, an integrated circuit (IC) chip, and a flexible substrate in accordance with an embodiment of the invention.

FIG. 2 illustrates a cross-sectional view of an example RF system including an RF-opaque layer, one or more antennas, an IC chip, and a flexible substrate in accordance with an embodiment of the invention.

Referring to FIG. 2, an RF system 200 includes a first portion 81 of a flexible substrate 16 overlapping a first surface 88 of an RF-opaque layer 20, a second portion 83 overlapping a second surface 89 of the RF-opaque layer 20, and a bent region 82 between the first portion 81 and the second portion 83. The RF-opaque layer 20 may be any type of suitable substrate. For example, RF-opaque layer 20 may be a stack of various layers configured for a specific functionality in an electronic device. The RF-opaque layer 20 may also include a metal support structure or a ground plane. In various embodiments, RF-opaque layer 20 may be opaque to some or all electromagnetic signals in the RF frequency range. For example, the RF frequency range may extend from about 3 kHz to about 300 GHz. However, the RF frequency range may also be considered to extend below 3 kHz and/or above 300 GHz depending on specific definitions within various areas of application.

Flexible substrate 16 may be any type of suitable flexible substrate that is capable of being bent after formation or capable of being formed with a bent region. Any curvature imparted on the flexible substrate 16 may be implemented such that electronic components and circuitry located on the flexible substrate 16 remains functional. For example, interconnects, transmission lines, and other electronic components may be formed on a flexible substrate 16 prior to a bending process. During the bending process a bent region 82 may be formed a such that the interconnects, transmission lines, and other electronic components maintain desired functionality.

In various embodiments, the flexible substrate 16 is an FPC. It should be noted that although a broad class of substrates may be considered FPCs, circuitry on an FPC is not required to be "printed" and may also be etched, formed in a lift-off process, etc. In one embodiment, the flexible substrate 16 is a Pyralux® PCB. As a specific example, the Pyralux® PCB may be a single-layer, double-layer, or multi-layer flexible PCB including one or more copper foil layers bonded to one or more polyimide dielectric layers. Alternatively, flexible substrate 16 may include polyester dielectric layers. In some embodiments, flexible substrate 16 may include one or more conductive materials such as copper (Cu), aluminum (Al), silver (Ag), gold (Au), or tungsten (W), as examples. Other suitable flexible substrates may be apparent to those of ordinary skill in the art.

One or more antennas 40 are located above the first portion 81 of the flexible substrate 16. The antennas 40 may be operatively coupled to the first portion 81 of flexible substrate 16. Antennas 40 may include any type of suitable antenna and may be configured to transmit and/or receive RF signals 70. Additional antennas may be included above the first surface 88 as well as at other locations in the RF system 200. For example, the antennas 40 may represent an array of antennas configured to track the movement of an object in three-dimensional space. The one or more antennas 40 may also include multiple antennas, some of which are configured only to transmit RF signals while others are configured only to receive RF signals.

In various embodiments, the antennas 40 are implemented as planar antennas. For example, antennas 40 may include a patch antenna, a tapered slot antenna (TSA), a Vivaldi antenna, a log periodic dipole antenna (LPDA), a quasi-Yagi antenna, a leaky wave antenna (LWA), or the like. Any suitable configuration may be chosen for the antennas 40 including patch, slot, ring, spiral, bow-tie configurations, or any other shape. In some embodiments, the antennas 40 include an electrically conductive material. In one embodiment, the antennas 40 include copper (Cu).

The antennas 40 are situated such that at least a portion of one or more of the antennas 40 overlaps with the first surface 88. In various embodiments, the antennas 40 are located directly above the first surface 88. In one embodiment, the antennas 40 are attached directly to flexible substrate 16. For example, the antennas 40 may be planar antennas formed on a Pyralux® PCB. However, additional layers may be present between the first portion 81 of the flexible substrate 16 and the antennas 40. Alternatively, the antennas 40 may be located directly on the first surface 88 of RF-opaque layer 20 and the flexible substrate 16 may be operatively coupled to the antennas 40 using components on RF-opaque layer 20.

The antennas 40 may be configured to transmit and/or receive RF signals 70 in the region directly above the first surface 88 of RF-opaque layer 20. RF signals 70 may include any RF frequency or band of RF frequencies. Dimensions of each of the antennas 40 may be related to desired frequency response of the RF system 200. For example, the antennas 40 may be configured to operate in the MMW range of the RF spectrum. Such antennas 40 may each have a length and a width between 1 mm and 2.5 mm. For example, each of the antennas 40 may have a length of about 1.5 mm and a width of about 850 µm. Alternatively, each of the antennas 40 may have a length of about 1.3 mm and a width of about 1.2 mm. However, the antennas 40 are not limited to these dimensions as a large number of factors may be considered when designing antennas. Therefore, a wide range of suitable dimensions not explicitly mentioned may be apparent to those of ordinary skill in the art.

Still referring to FIG. 2, the RF system 200 further includes an IC chip 60 located below the second portion 83 of flexible substrate 16. IC chip 60 may be operatively coupled to the second portion 83 of flexible substrate 16 so that IC chip 60 is able to communicate with the antennas 40 using the bent region 82 of flexible substrate 16. Similar to the antennas 40, IC chip 60 is situated such that at least a portion of IC chip 60 overlaps with the second surface 89 of RF-opaque layer 20 and, in various embodiments, the entire IC chip 60 is located directly below the second surface 89. IC chip 60 may be directly attached to the second portion 83 of flexible substrate 16 or may have intervening layers.

The IC chip 60 may include RF front end circuitry in addition to other circuitry and may be configured to process RF signals transmitted and received at the antennas 40 and is an RFIC in one embodiment. For example, in various embodiments, IC chip 60 is configured to process the RF signals 70 by communicating with the antennas 40 using transmission lines located on flexible substrate 16. The IC chip 60 may have a receive interface connected to receiving antennas and/or a transmit interface connected to transmitting antennas. In some configurations, a receive interface and a transmit interface may be combined into a single interface.

In various embodiments, the RF front end circuitry is designed to operate in a super high frequency (SHF) or an extremely high frequency (EHF) regime. For example, the IC chip 60 may contain MMW circuitry designed to operate in the unlicensed band from 57 GHz to 64 GHz. Additionally or alternatively, the IC chip 60 may contain circuitry designed to operate in the 28 GHz regime (in 5G applications, for example). In one embodiment, IC chip 60 contains circuitry configured to operate in a frequency band including 77 GHz. For example, automotive radar applications may utilize RF signals 70 that include 77 GHz. Other frequency bands are also possible. For example, IC chip 60 may also contain circuitry designed to operate in frequency bands designated for other communication applications such as a global positioning system (GPS) network, global system for mobile communications (GSM) network, long-term evolution (LTE) network, worldwide interoperability for microwave access (WiMAX) networks, and/or industrial, scientific, and medical (ISM) band-based networks such as wireless local area networks (WLANs), Bluetooth, near field communication (NFC), etc.

In various embodiments, IC chip 60 includes a semiconductor substrate. In one embodiment, the semiconductor substrate includes silicon. In another embodiment, the semiconductor substrate includes silicon germanium (SiGe). In still another embodiment, the semiconductor substrate includes gallium arsenide (GaAs). Other suitable materials suitable for use as a substrate for IC chip 60 may be apparent to those of ordinary skill in the art.

IC chip 60 may include additional components such as active and passive devices, metal layers, dielectric layers, doped and intrinsic semiconductor regions, redistribution layers, and other components known in the art. In various embodiments, IC chip 60 has already undergone back end of line (BEOL) processing before being coupled to flexible substrate 16.

A possible advantage of embodiments in which the antennas 40 and IC chip 60 are fully overlapping respective surfaces of RF-opaque layer 20 may be to reduce the overall size of RF system 200. For example, as shown in FIG. 2, only a small additional flexible substrate thickness 17 is required to couple the antennas 40 located above the first surface 88 to IC chip 60 located below the second surface 88. In various embodiments flexible substrate thickness 17 is between 100 m and 500 µm. In one embodiment, flexible substrate thickness 17 is about 150 µm. In another embodiment, flexible substrate thickness 17 is about 200 m.

Additionally, flexible substrate 16 may be bent so the bent region 82 is very close to a side surface of RF-opaque layer 20. As a result, the total width of the electronic device added by the bent region 82 of flexible substrate 16 may advantageously be kept very small. For example, lateral dimensions of the antennas 40 may be much larger than flexible substrate thickness 17. Therefore, the total width added to implement equivalent antennas 40 adjacent to RF-opaque layer 20 rather than overlapping the first surface 88, would be much larger than embodiments using flexible substrate 16 or other suitable thin flexible means.

Figure 3:
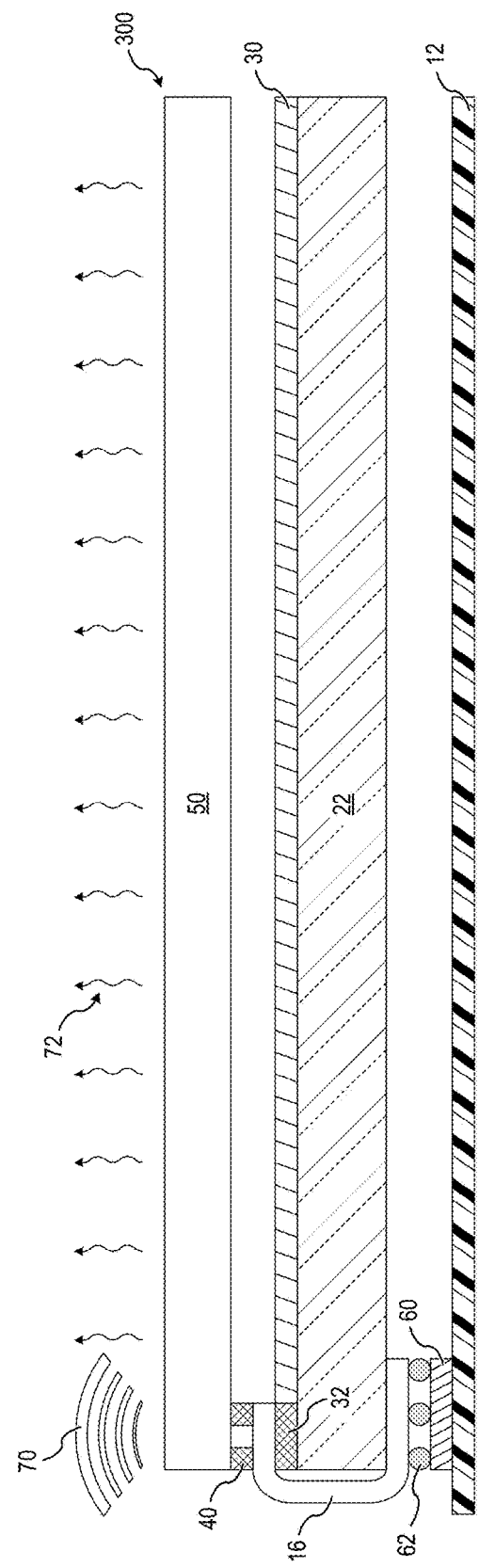
FIG. 3 illustrates a cross-sectional view of an example RF system including a liquid crystal display (LCD) screen, antennas, an IC chip, and a flexible substrate in accordance with an embodiment of the invention.

FIG. 3 illustrates a cross-sectional view of an example RF system including an LCD screen, antennas, an IC chip, and a flexible substrate in accordance with an embodiment of the invention.

Referring to FIG. 3, an RF system 300 includes antennas 40 located on a first side of an LCD screen 22 and an IC chip 60 located on an opposite second side of the LCD screen 22. The antennas 40 are operatively coupled to the IC chip 60 using a flexible substrate 16. The antennas 40 are configured to transmit and/or receive RF signals 70 on the first side of the LCD screen 22. RF system 300 may be a specific implementation of RF system 200 with similarly labeled elements being as previously described.

Optionally, RF system 300 may include a conductive layer 30 that is located above the LCD screen 22 on the first side. In one embodiment, the conductive layer 30 is a touch sensing layer of a touch screen for an electronic device. The touch sensing layer may include conductive traces including driving lines and sensing lines configured to detect touch events input by a user. The conductive layer 30 may be RF-opaque due to the inclusion of conductive regions.

The LCD screen 22 may be considered a specific implementation of the RF-opaque layer 20 shown in FIG. 2. For example, LCD screen 22 may include a reflector layer which is RF-opaque. Other layers of the LCD screen 22 may also be RF-opaque. In some cases, the combination of the LCD screen 22 and the conductive layer 30 may be considered a specific example of the RF-opaque layer 20 of FIG. 2.

A ground plane region 32 is optionally included on the flexible substrate 16 on an opposite side of flexible substrate 16 as the antennas 40. The ground plane region 32 may be configured to prevent signals from passing between the antennas 40 and the LCD screen 22. The ground plane region 32 may also help to direct the RF signals 70 in a direction away from the LCD screen 22.

A transparent layer 50 may be included above the LCD screen 22 and the conductive layer 30. In various embodiments, transparent layer 50 includes a glass material. In one embodiment, transparent layer 50 includes Gorilla® Glass. In other embodiments, the transparent layer 50 includes a plastic material. Other suitable transparent materials that may be used to implement transparent layer 50 may be apparent to those of ordinary skill in the art.

The transparent layer 50 may be transparent or translucent to electromagnetic radiation. For example, the transparent layer 50 may be transparent to visible light. Transparent layer 50 may also be transparent to RF signals. In one embodiment, the LCD screen 22 of configured to display an image by transmitting visible light 72 through transparent layer 50. RF signals 70 may also be transmitted through transparent layer 50 on the same side of LCD screen 22 as the visible light 72.

The IC chip 60 is coupled to the flexible substrate 16 using solder balls 62. The solder balls 62 may be part of a ball grid array (BGA) attachment method. For example, a BGA and solder reflow process may be used to provide electrical and physical connections between the IC chip 60 and flexible substrate 16. Alternatively, IC chip 60 may be attached to flexible substrate 16 using any suitable attachment method including other surface mount technology (SMT) methods, wire bonding, conductive pillars, adhesive, and the like.

A PCB 12 is located below LCD screen 22 may be operatively coupled to IC chip 60. In various embodiments, a first major surface of the IC chip 60 is attached to flexible substrate 16 while an opposing second major surface is attached to the PCB 12. The PCB 12 may include additional electronic devices, processors, memory, and the like. In various embodiments, PCB 12 is a main board for an electronic device including radar system 300. For example, the PCB 12 may be the main board for a mobile phone, smartwatch, laptop computer, IoT device, virtual reality headset, radar module in a vehicle, and the like.

Figure 4:
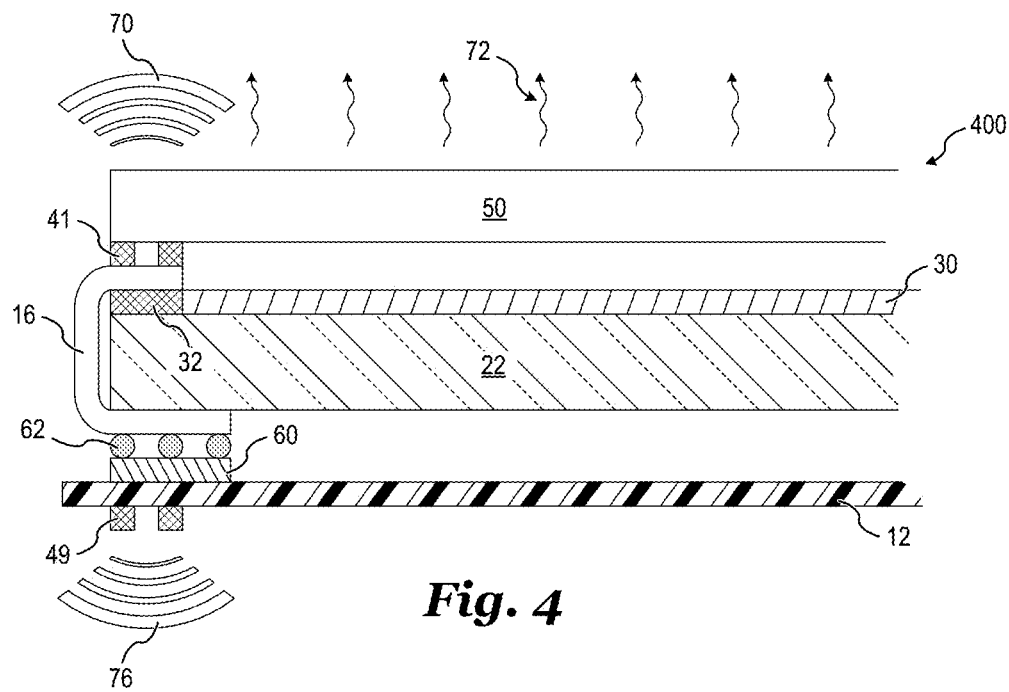
FIG. 4 illustrates a cross-sectional view of an example RF system including front side and backside antennas, an LCD screen, an IC chip, and a flexible substrate in accordance with an embodiment of the invention.

FIG. 4 illustrates a cross-sectional view of an example RF system including front side and backside antennas, an LCD screen, an IC chip, and a flexible substrate in accordance with an embodiment of the invention.

Referring to FIG. 4, an RF system 400 includes a transparent substrate 50 located above an LCD screen 22 and a PCB 12 located below the LCD screen 22. The RF system 400 is configured to transmit and/or receive RF signals 70 through transparent substrate 50 as well as to transmit visible light 72 through transparent substrate 50. RF system 400 may be a specific implementation of RF system 300 with similarly labeled elements being as previously described.

In addition to the RF signals 70 on the transparent substrate 50 side of LCD screen 22, RF system 400 is further configured to transmit and/or receive second RF signals 76 on the PCB 12 side of the LCD screen 22. The RF signals 70 are transmitted and/or received by front side antennas 41 which may be a specific implementation of antenna 40 as illustrated in FIGS. 2 and 3. The second RF signals 76 are transmitted and/or received by backside antennas 49 located on or within PBC 12. In one embodiment, the front side antennas 41 and the backside antennas 49 are both operatively coupled to an IC chip 60. Alternatively, backside antennas 49 may be operatively couple to a separate IC chip located anywhere in RF system 400.

RF system 400 may advantageously allow RF signals to be transmitted and received on both sides of LCD screen 22 without increasing the size of a device that includes RF system 400. For example, in the absence of flexible substrate 16 a bezel may be added to one or more border regions of LCD screen 22 thereby undesirably increasing the size of the device. In contrast, RF system 400 includes a thin, flexible substrate 16 enabling coupling of an IC chip 60 to antennas located directly above an LCD screen 22 beneficially allowing a device that may include RF system 400 to be smaller.

Figure 5:
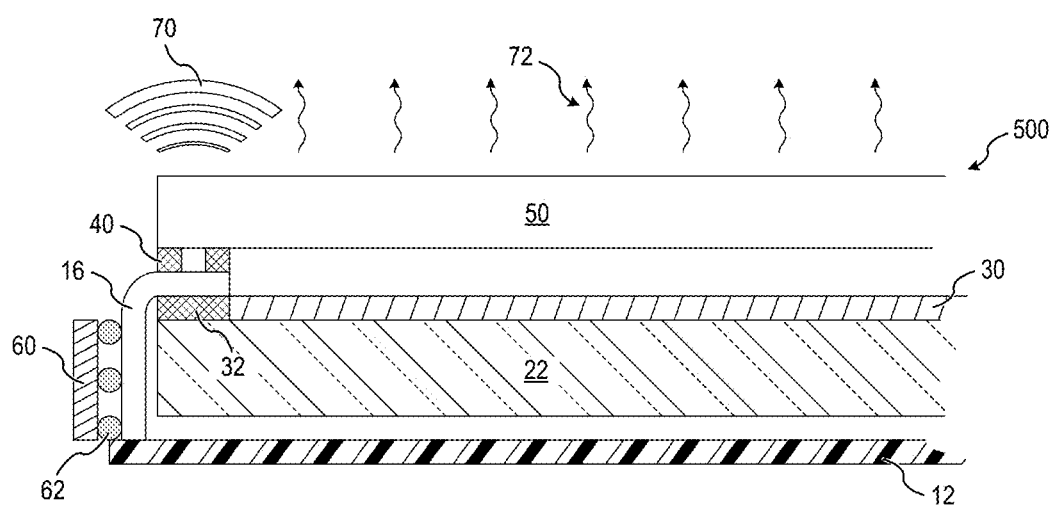
FIG. 5 illustrates a cross-sectional view of an example RF system including an IC chip oriented at a substantially 90° angle relative to a major surface of an LCD screen, antennas, and a flexible substrate in accordance with an embodiment of the invention.

FIG. 5 illustrates a cross-sectional view of an example RF system including an IC chip oriented at a substantially 90° angle relative to a major surface of an LCD screen, antennas, and a flexible substrate in accordance with an embodiment of the invention.

Referring to FIG. 5, an RF system 500 includes a transparent substrate 50 located above an LCD screen 22 and a PCB 12 located below the LCD screen 22. The RF system 500 is configured to transmit and/or receive RF signals 70 through transparent substrate 50 as well as to transmit visible light 72 through transparent substrate 50. RF system 500 may be an alternative implementation of RF system 300 with similarly labeled elements being as previously described.

In contrast to RF system 300, an IC chip 60 included in RF system 500 is located along a side surface of an LCD screen 22 and is oriented at a substantially 90° angle relative to antennas 40 located above LCD screen 22. The IC chip 60 is attached to a flexible substrate 16 that is operatively coupled to the antennas 40 and a PCB 12. The configuration of RF system 500 may advantageously allow the thickness of a device including RF system 500 to be decreased by slightly increasing a dimension parallel to the face of the LCD screen. For example, the thickness of IC chip 60 and the solder balls 62 may be moved from below the LCD screen 22 to a side surface of the LCD screen 22 as shown. The thickness of IC chip 60 and a suitable attachment method may be chosen to be much smaller than the dimensions of a bezel for antennas that might be included along a border of an LCD screen. Therefore, the configuration of RF system 500 may beneficially allow the device to be thinner while still decreasing the size of the device including RF system 500 when compared to devices including a bezel for antennas.

The location of IC chip 60 at a side of the LCD screen 20 may also advantageously reduce the distance from IC chip 60 to antennas 40. For example, transmission lines on the flexible substrate 16 of RF system 500 may be shorter than those of the RF system 300. The reduced distance may beneficially reduce signal losses within the transmission lines. Additionally, in RF system 400, the IC chip 60 may be attached to the flexible substrate 16 at a substantially 90° angle relative to a major surface of the LCD screen similar to RF system 500. Such a configuration may enable an equal distance from the front side antennas 41 and backside antennas 49 to the IC chip 60.

Figure 6A:
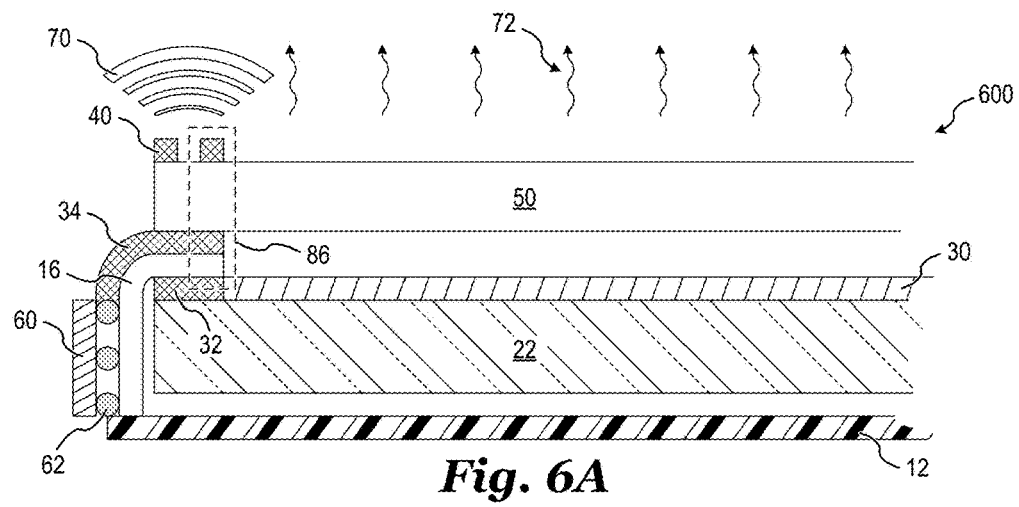
FIG. 6A illustrates a cross-sectional view of an example RF system including an antennas located on an outer surface of a transparent substrate, an LCD screen, an IC chip, and a flexible substrate in accordance with an embodiment of the invention.
Figure 6B:
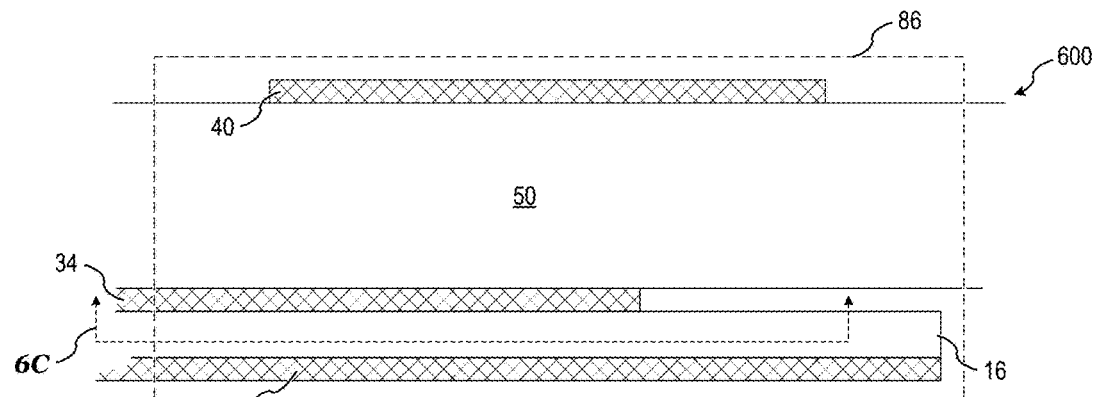
FIG. 6B illustrates a cross-sectional view of a portion of the RF system.
Figure 6C:
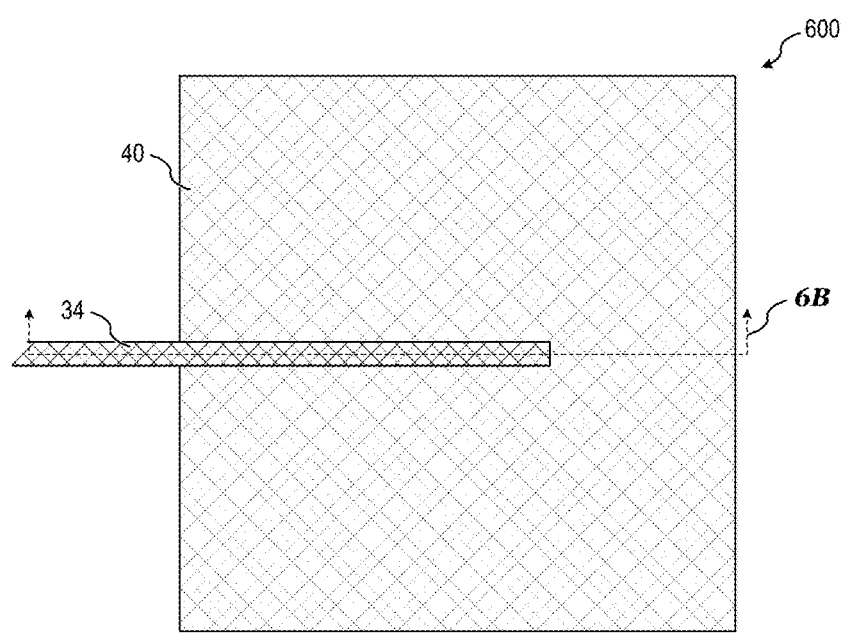
FIG. 6C illustrates a bottom view of a portion of the RF system.

FIG. 6A illustrates a cross-sectional view of an example RF system including an antennas located on an outer surface of a transparent substrate, an LCD screen, an IC chip, and a flexible substrate in accordance with an embodiment of the invention, FIG. 6B illustrates a cross-sectional view of a portion of the RF system, and FIG. 6C illustrates a bottom view of a portion of the RF system.

Referring to FIGS. 6A, 6B, and 6C an RF system 600 includes a transparent substrate 50 located above an LCD screen 22 and a PCB 12 located below the LCD screen 22. The RF system 600 is configured to transmit and/or receive RF signals 70 through transparent substrate 50 as well as to transmit visible light 72 through transparent substrate 50. RF system 600 may be an alternative implementation of RF system 500 with similarly labeled elements being as previously described.

In contrast to RF system 500, antennas 40 included in RF system 600 are located above the transparent substrate 50. The antennas 40 may be formed on the transparent substrate 50 by etching a conductive layer or using a direct structuring laser process and subsequent conductive material deposition, as examples. The antennas 40 may be formed during a PCD fabrication process. Transmission lines 34 located on a flexible substrate 16 are included to operatively couple an IC chip 60 to the antennas 40 through transparent substrate 50. For example, one of the antennas 40 may be coupled to transmission lines 34 within a dashed region 86 as shown.

FIG. 6B shows a detailed view of the dashed region 86 of FIG. 6A showing one of the antennas 40, a transmission line 34, flexible substrate 16, and ground plane region 32. A bottom view of the antenna 40 and transmission line 34 is shown in FIG. 6C. In one embodiment, the antenna 40 is a proximity coupled patch antenna, but any suitable antenna configuration may be used.

The configuration of RF system 600 may advantageously enhance the bandwidth of the RF system 600 due to the dielectric constant of the transparent substrate 50. For example, the transparent substrate may include a glass material with a high dielectric constant. The high dielectric constant of the glass material may enhance the bandwidth of antennas 40 located above transparent layer 50. In addition, integrated of antennas 40 with transparent substrate 50 may also advantageously allow integration of antennas 40 and IC chip 60 using standard packaging processes.

Figure 7:
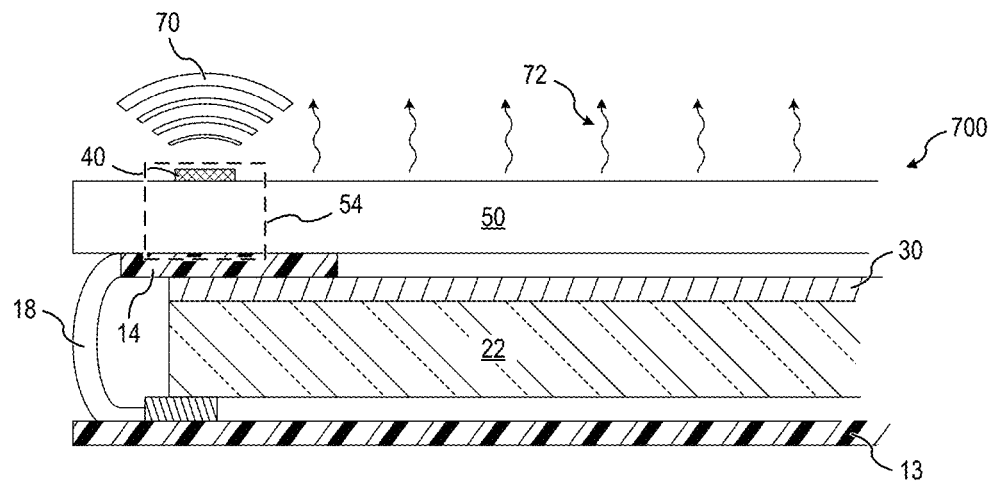
FIG. 7 illustrates a cross-sectional view of an example RF system including a first printed circuit board (PCB), an antenna coupled to circuitry on a second PCB using an integrated region within a transparent substrate, an LCD screen, and a flexible connector in accordance with an embodiment of the invention.

FIG. 7 illustrates a cross-sectional view of an example RF system including a first PCB, an antenna coupled to circuitry on a second PCB using an integrated region within a transparent substrate, an LCD screen, and a flexible connector in accordance with an embodiment of the invention.

Referring to FIG. 7, an RF system 700 includes a transparent substrate 50 located above an LCD screen 22 and a PCB 12 located below the LCD screen 22. The RF system 700 is configured to transmit and/or receive RF signals 70 through transparent substrate 50 as well as to transmit visible light 72 through transparent substrate 50. RF system 700 may be an alternative implementation of RF system 600 with similarly labeled elements being as previously described.

RF system 700 includes a first PCB 13 located below the LCD screen 22 and a second PCB 14 located above the LCD screen 22. A flexible connector 18 is included to operatively couple the first PCB 13 to the second PCB 14 which is in turn operatively coupled to an antenna 40 located above the transparent substrate 50 using an integrated region 54. The integrated region 54 may include conductive layers and insulating layers that are structured as ground planes regions, interconnects, transmission lines, vias, contact pads, IC chips, and the like.

For example, the first PCB 13 and/or the second PCB 14 may include circuitry and or IC chips configured to process the RF signals 70 transmitted and/or received by the antenna 40. The flexible connector 18 is configured to couple the antenna 40 to the first PCB 13 located on the opposite side if LCD screen 22 similar to the flexible substrate 16 of other embodiments. Flexible connector 18 may be any suitable type of flexible connector. In one embodiment, flexible connector 18 is an FFC.

Figure 8:
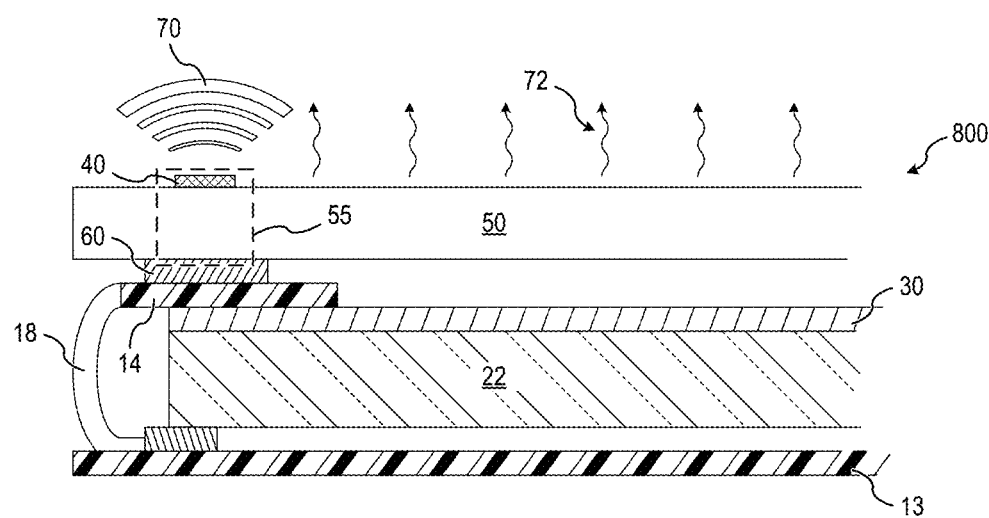
FIG. 8 illustrates a cross-sectional view of an example RF system including a first PCB, an antenna coupled to an IC chip located on a second PCB using an integrated region within a transparent substrate, an LCD screen, and a flexible connector in accordance with an embodiment of the invention.

FIG. 8 illustrates a cross-sectional view of an example RF system including a first PCB, an antenna coupled to an IC chip located on a second PCB using an integrated region within a transparent substrate, an LCD screen, and a flexible connector in accordance with an embodiment of the invention.

Referring to FIG. 8, an RF system 800 includes a transparent substrate 50 located above an LCD screen 22 and a PCB 12 located below the LCD screen 22. The RF system 800 is configured to transmit and/or receive RF signals 70 through transparent substrate 50 as well as to transmit visible light 72 through transparent substrate 50. RF system 800 may be a specific implementation of RF system 700 with similarly labeled elements being as previously described.

An IC chip 60 is included on the second PCB 14 operatively coupled to an antenna 40 located above the transparent substrate 50 using an integrated region 55. The IC chip 60 is configured to process the RF signals 70 on the same side of the LCD screen 22 as the side that the RF signals 70 are transmitted and/or received. Similar to the integrated region 54 of RF system 700, the integrated region 55 may include a variety of elements such as ground plane regions and transmission lines, as examples.

Figure 9A:
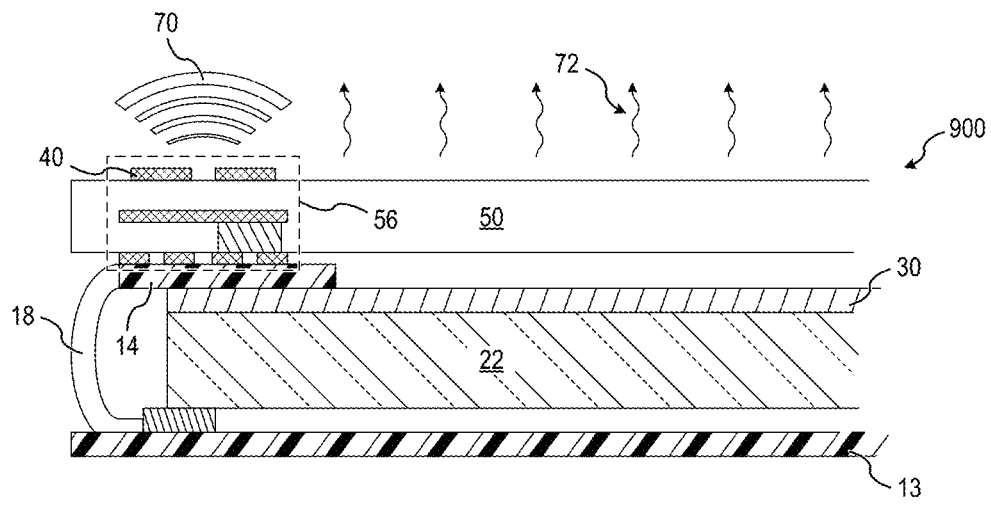
FIG. 9A illustrates a cross-sectional view of an example RF system including a first PCB, antennas coupled to circuitry on a second PCB using an integrated region within a transparent substrate, an LCD screen, and a flexible connector.
Figure 9B:
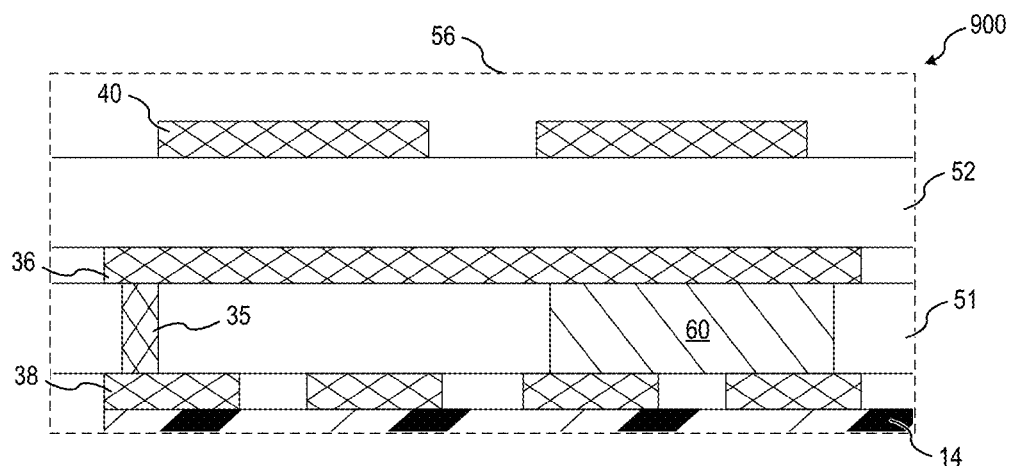
FIG. 9B illustrates a cross-sectional view of a portion of the RF system including the antennas, a ground plane region, and an IC chip integrated with the transparent substrate in the integrated region in accordance with an embodiment of the invention.

FIG. 9A illustrates a cross-sectional view of an example RF system including a first PCB, antennas coupled to circuitry on a second PCB using an integrated region within a transparent substrate, an LCD screen, and a flexible connector, and FIG. 9B illustrates a cross-sectional view of a portion of the RF system including the antennas, a ground plane region, and an IC chip integrated with the transparent substrate in the integrated region in accordance with an embodiment of the invention.

Referring to FIGS. 9A and 9B, an RF system 900 includes a transparent substrate 50 located above an LCD screen 22 and a PCB 12 located below the LCD screen 22. The RF system 900 is configured to transmit and/or receive RF signals 70 through transparent substrate 50 as well as to transmit visible light 72 through transparent substrate 50. RF system 900 may be a specific implementation of RF system 700 with similarly labeled elements being as previously described.

RF system 900 includes an integrated region 56 through which one or more antennas 40 are operatively coupled to an IC chip 60 located within the integrated region 56, a first PCB 13 located below the LCD screen 22, and a second PCB 14 located above the LCD screen 22.

Electrical contacts 38 couple to integrated region 56 to the second PCB 14. A first transparent layer 51 is located above the electrical contacts 38. A ground plane region 38 is located above transparent layer 51 and is connected to one or more of the electrical contacts 38 using one or more vias 35. The IC chip 60 is located within the first transparent layer 51 and is coupled to the one or more of the electrical contacts 38 as well as the antennas 40 using transmission lines (not shown) in the same layer as the ground plane region 36.

A second transparent layer 52 is located above the ground plane region 36. The antennas 40 are located above the second transparent layer 52. The combination of the first transparent layer 51 and the second transparent layer 52 make up transparent layer 50. In various embodiments one or both of the first transparent layer 51 and the second transparent layer 52 are glass. In one embodiment, the first transparent layer 51 and the second transparent layer 52 are Gorilla® Glass.

The number of layers included in the integrated region 56 may depend on specific design considerations and desired functionality. For example, the integrated region 56 may include two transparent layers as shown in FIGS. 9A and 9B or may include four transparent layers. In other embodiments, other numbers of layers may be included in integrated region 56.

The RF system 900 may advantageously reduce the thickness of a device including the RF system 900 by integrating the IC chip 60 into transparent layer 50. As a result the overall thickness of the device may beneficially be reduced by an amount approximately equal to the thickness of the IC chip 60. Additionally, configurations of RF systems with antennas on a top surface of the transparent layer such as RF systems 600, 700, 800, and 900 may provide additional benefits to the gain of the RF system.

Figure 10:
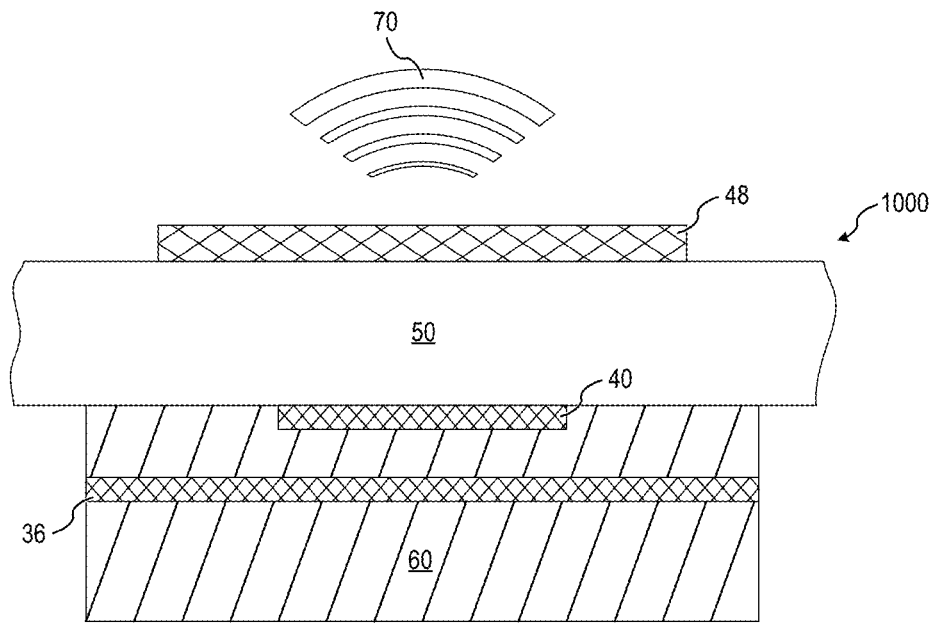
FIG. 10 illustrates a cross-sectional view of an example RF system including a parasitic antenna located on a top surface of a transparent substrate, an antenna located at a bottom surface of the transparent substrate, and an IC chip in accordance with an embodiment of the invention.

FIG. 10 illustrates a cross-sectional view of an example RF system including a parasitic antenna located on a top surface of a transparent substrate, an antenna located at a bottom surface of the transparent substrate, and an IC chip in accordance with an embodiment of the invention.

Referring to FIG. 10, an RF system 1000 includes an IC chip 60 including an antenna 40 located below a transparent substrate 50 and a parasitic antenna 48 located above the transparent substrate 50. The transparent substrate 50, IC chip 60, and parasitic antenna 48 of RF system 1000 may be a specific antenna configuration usable with any of the RF systems as described herein with similarly labeled elements being as previously described.

The parasitic antenna 48 may be operatively coupled to the antenna 40 through transparent substrate 50. A ground plane region 36 may be optionally included in IC chip 60 and may be configured to direct electromagnetic radiation in appropriate directions within IC chip 60. In one embodiment, IC chip 60 is an RFIC. In an alternative embodiment, IC chip 60 is an RF package including an RFIC. RF front end circuitry may be included in IC chip 60 below ground plane region 36. The RF front end circuitry may be configured to process RF signals 70 and may be coupled to the antenna 40 using transmission lines within IC chip 60. Antenna 40 may radiate RF signals that excite the parasitic antenna 48 causing it to radiate RF signals 70. In turn, RF signals 70 received at the parasitic antenna 48 may excite the antenna 40 which may then allow reception of RF signals 70 at the RF front end circuitry.

Figure 11:
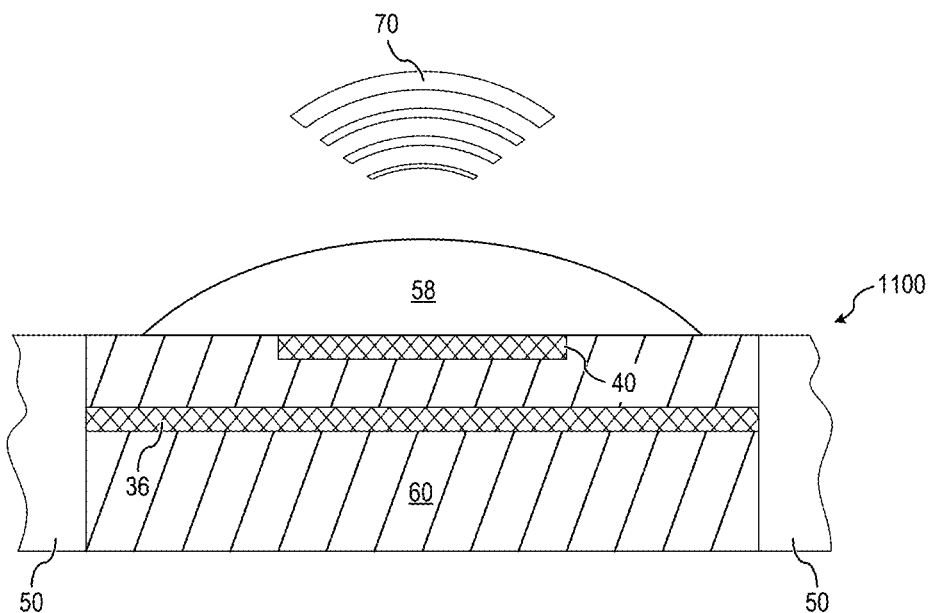
FIG. 11 illustrates a cross-sectional view of an example RF system including a shaped transparent region located above an antenna and an IC chip where the antenna and the IC chip are integrated with a transparent substrate in accordance with an embodiment of the invention.

FIG. 11 illustrates a cross-sectional view of an example RF system including a shaped transparent region located above an antenna and an IC chip where the antenna and the IC chip are integrated with a transparent substrate in accordance with an embodiment of the invention.

Referring to FIG. 11, an RF system 1100 includes an IC chip 60 including an antenna 40 and an optional ground plane region 36 located within a transparent substrate 50 and a shaped transparent region 58 located above the transparent substrate 50. The transparent substrate 50, IC chip 60, and shaped transparent region 58 of RF system 1100 may be a specific antenna configuration usable with any of the RF systems as described herein with similarly labeled elements being as previously described.

The shaped transparent region 58 may be configured to function as an RF lens for RF signals 70 that are transmitted and/or received by antenna 40. For example, the desired field of view of antenna 40 may be in a specific, localized region above transparent substrate 50. In the absence of the shaped transparent region 58, the radiation pattern of RF signals 70 may be much broader than desired for the desired application. The shaped transparent region 58 may advantageously focus RF signals 70 to be predominantly radiated in a specifically defined region above transparent substrate 50. Alternatively, in the absence of shaped transparent region 50, the radiation pattern of antenna 40 may be too focused for a specific application. In these cases, shaped transparent region 58 may broaden and homogenize the RF signals 70 in the region above transparent substrate 50. For example, the signal strength of RF signals 70 may be substantially similar at all points at a specified distance above transparent substrate 50.

Figure 12:
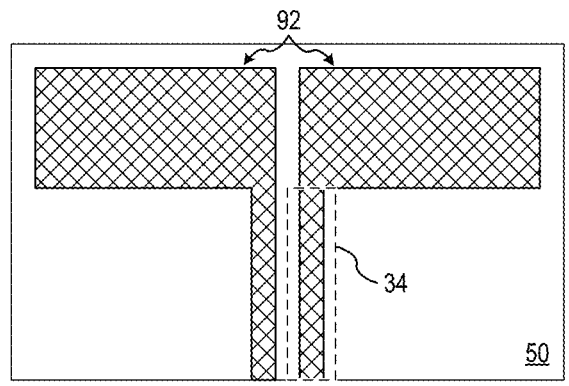
FIG. 12 illustrates a top view of an example antenna usable in an RF system where the antenna is a dipole antenna located on a transparent substrate in accordance with an embodiment of the invention.
Figure 13:
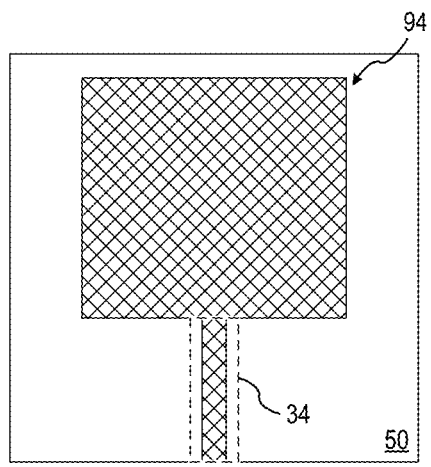
FIG. 13 illustrates a top view of another example antenna usable in an RF system where the antenna is a patch antenna located on a transparent substrate in accordance with an embodiment of the invention.
Figure 14:
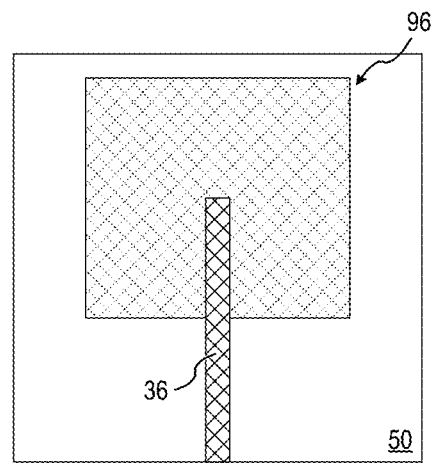
FIG. 14 illustrates a bottom view of still another example antenna usable in an RF system where the antenna is a proximity coupled patch antenna located on a transparent substrate in accordance with an embodiment of the invention.
Figure 15:
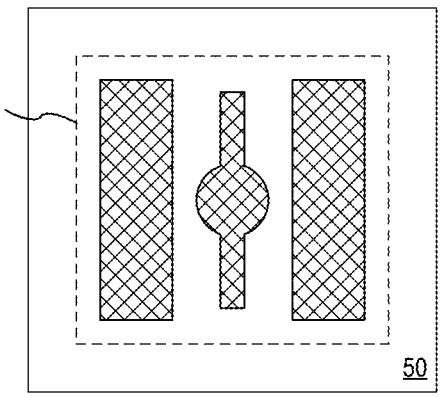
FIG. 15 illustrates a top view of yet another example antenna usable in an RF system where the antenna is a magneto-electric dipole antenna located on a transparent substrate in accordance with an embodiment of the invention.

FIGS. 12-15 illustrate example antennas in accordance with embodiments of the invention usable in RF systems as described herein. FIG. 12 illustrates a top view of a dipole antenna 92 including transmission lines 34 located on a transparent substrate 50. FIG. 13 illustrates a top view of a patch antenna 94 including a transmission line 34 located on a transparent substrate 50. FIG. 14 illustrates a bottom view of a proximity coupled patch antenna 96 located on a top surface of a transparent substrate 50 and a transmission line 34 located on an opposite bottom surface of the transparent substrate. FIG. 15 illustrates a top view of a magneto-electric dipole antenna 98 located on a transparent substrate 50.

Any of the antennas in the embodiment RF systems described herein may be implemented using the example antennas illustrated in FIGS. 12-15. For example, the antennas 40 of RF system 300 may be implemented as patch antennas similar to the patch antenna 94 as illustrated in FIG. 13. As another example, the antennas 40 of RF system 600 may be implemented as proximity coupled patch antennas similar to the proximity coupled patch antenna 96 as illustrated in FIG. 14. However, the RF systems are not limited to the antenna configurations explicitly shown and described. Any suitable antenna configuration as apparent to one of ordinary skill in the art may be used to implement any of the antennas in the RF systems described herein.

Figure 16:
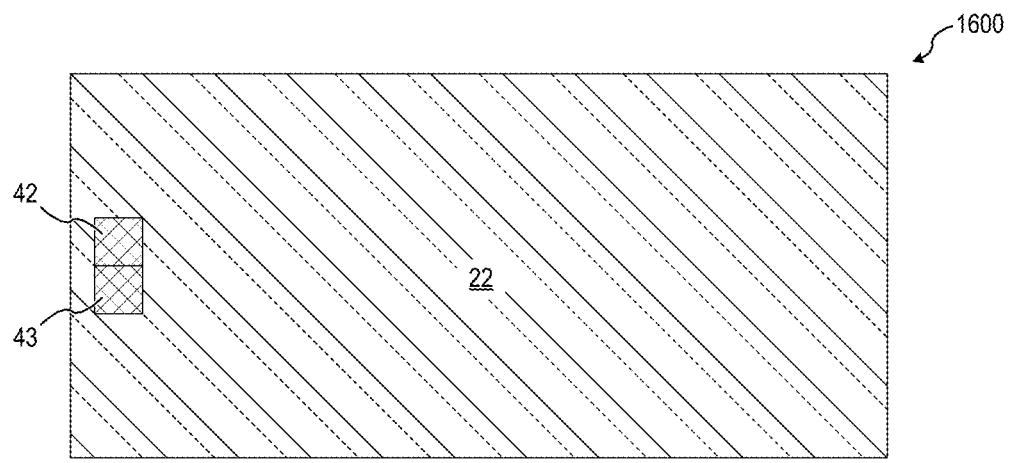
FIG. 16 illustrates a top view of an example RF system including a transmit antenna and a receive antenna centrally located in a top region of a liquid crystal display (LCD) screen in accordance with an embodiment of the invention.

FIG. 16 illustrates a top view of an example RF system including a transmit antenna and a receive antenna centrally located in a top region of an LCD screen in accordance with an embodiment of the invention.

Referring to FIG. 16, an RF system 1600 includes a transmit antenna 42 and a receive antenna 43 located directly above an LCD screen 22. In one embodiment, the LCD screen 22 may be an LCD screen of a mobile device. In other embodiments, the LCD screen 22 may be the LCD screen of other electronic devices that include RF system 1600. Although, the LCD screen 22 as illustrated here is rectangular in shape, any suitable shape is possible and may depend on the specific type of electronic device or a particular application.

Transmit antenna 42 and receive antenna 43 are configured to transmit and/or receive RF signals in a region directly above the LCD screen 22. In one embodiment, transmit antenna 42 and receive antenna 43 are configured as a bistatic radar system. In a bistatic radar system, two or more antennas may be configured so that a subset of the two or more antennas are configured to only transmit RF signals while the remaining antennas are configured only to receive RF signals. In other embodiments, additional antennas may be incorporated in the region directly above the LCD screen 22. In an alternative embodiment, transmit antenna 42 and receive antenna 43 may be replaced with a single antenna configured as a monostatic radar antenna that both transmits and receives RF signals.

Figure 17:
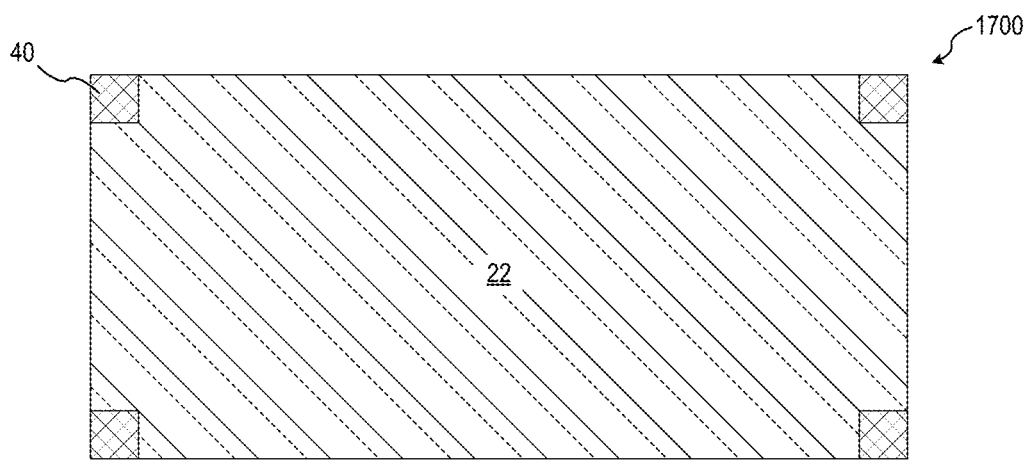
FIG. 17 illustrates a top view of another example RF system including four antennas located at the corners of an LCD screen in accordance with an embodiment of the invention.

FIG. 17 illustrates a top view of another example RF system including four antennas located at the corners of an LCD screen in accordance with an embodiment of the invention.

Referring to FIG. 17, an RF system 1700 includes four antennas 40 located at the corners and in a region directly above an LCD screen 22. In one embodiment, the antennas 40 may be configured as individual monostatic radar antennas. In this configuration, RF signals transmitted and received at each of the antennas 40 may be processed individually. This may be referred to as non-coherent signal processing. In other embodiments, some or all of the antennas 40 may be configured to operate as a unified radar system using coherent signal processing. Additional antennas may be located around the edges of the LCD screen 22. In some embodiments, fewer than four of the corners of the LCD screen 22 may have an antenna. For example, in one alternative embodiment, only two antennas 40 may be located in the left two corners of LCD screen 22. These two corners may be the top corners of a mobile device, for example.

Figure 18:
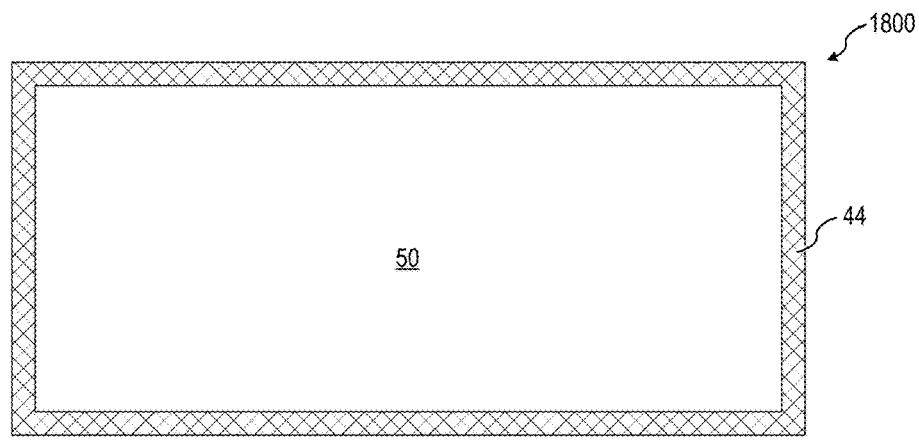
FIG. 18 illustrates a top view of an example RF system including an antenna region configured for cellular communication integrated with a transparent substrate located above an LCD screen in accordance with an embodiment of the invention.

FIG. 18 illustrates a top view of an example RF system including an antenna region configured for cellular communication integrated with a transparent substrate located above an LCD screen in accordance with an embodiment of the invention.

Referring to FIG. 18, an RF system 1800 includes a communication antenna 44 integrated with a transparent substrate 50. For example, communication antenna 44 may be etched onto a surface of transparent substrate 50. Alternatively, communication antenna 44 may be integrated within transparent substrate 50. In various embodiments communication antenna 44 includes multiple antenna regions configured for communication with networks using multiple communications standards such as GPS, GSM, LTE, Wi-Fi, Bluetooth, and the like. In some embodiments, communication antenna 44 does not extend entirely around the border of the transparent substrate 50. An LCD screen as previously described may be located below transparent substrate 50 which is configured as a display surface for an electronic device.

Figure 19:
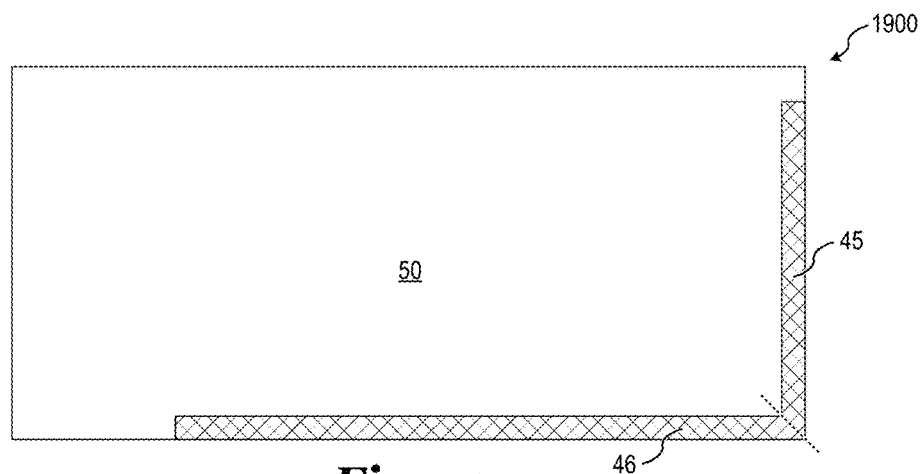
FIG. 19 illustrates a top view of an example RF system including two communication antennas configured for cellular communication integrated with a transparent substrate located above an LCD screen in accordance with an embodiment of the invention.

FIG. 19 illustrates a top view of an example RF system including two communication antennas configured for cellular communication integrated with a transparent substrate located above an LCD screen in accordance with an embodiment of the invention.

Referring to FIG. 19, an RF system 1900 includes a first communications antenna 45 and a second communications antenna 46 integrated with a transparent substrate 50. In various embodiments, the first communication antenna 45 is configured to communicate using a first communication standard while the second communication antenna 46 is configured to communicate using a different communication standard. For example, in one embodiment, the first communication antenna 45 is configured to communicate with an LTE network while the second communication antenna 46 is configured to communicate with a GSM network. In another embodiment, the first communication antenna 45 is configured to communicate with an Wi-Fi network while the second communication antenna 46 is configured to communicate using a LTE network.

Figure 20:
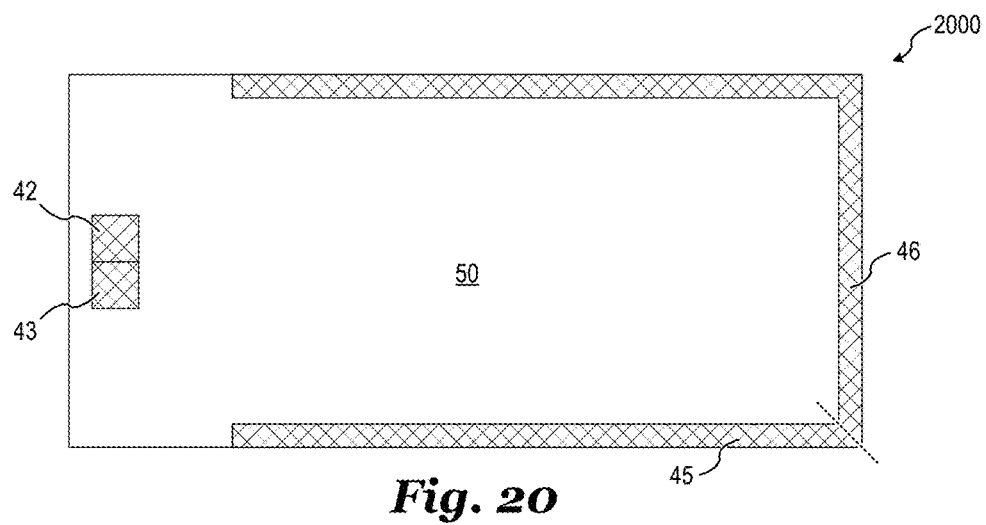
FIG. 20 illustrates a top view of an example RF system including two communication antennas configured for cellular communication and two antennas configured for radar applications integrated with a transparent substrate located above an LCD screen in accordance with an embodiment of the invention.

FIG. 20 illustrates a top view of an example RF system including two communication antennas configured for cellular communication and two antennas configured for radar applications integrated with a transparent substrate located above an LCD screen in accordance with an embodiment of the invention.

Referring to FIG. 20, an RF system 2000 includes a transmit antenna 42, a receive antenna 43, a first communication antenna 45, and a second communication antenna 46 integrated with a transparent substrate 50. For example, the transmit antenna 42 and the receive antenna 43 may be part of a bistatic radar system as in RF system 1600 described previously in reference to FIG. 16. More or fewer antennas may be included and may depend on the specific type of device and particular application.

The RF systems 1600, 1700, 1800, 1900, and 2000 may be top views for RF systems of any other embodiment described herein. For example, RF system 2000 may be a top view of a specific implementation of the RF system 600 that includes a bistatic radar system located at the top of an LCD screen of a mobile device while also including an LTE antenna and a Wi-Fi antenna located on the bordering sides and bottom of the LCD screen. As another example, RF system 1800 may be a top view of a specific implementation of the RF system 700 that includes several communication antennas integrated with a glass display screen of a tablet computer.

As will be apparent to those of ordinary skill in the art, the specific RF systems described herein may be combined in a variety of configurations, many of which have not been explicitly described for purposes of brevity. It is then understood that the RF systems are not intended to be restricted to only the combinations provided as examples.

Figure 21:
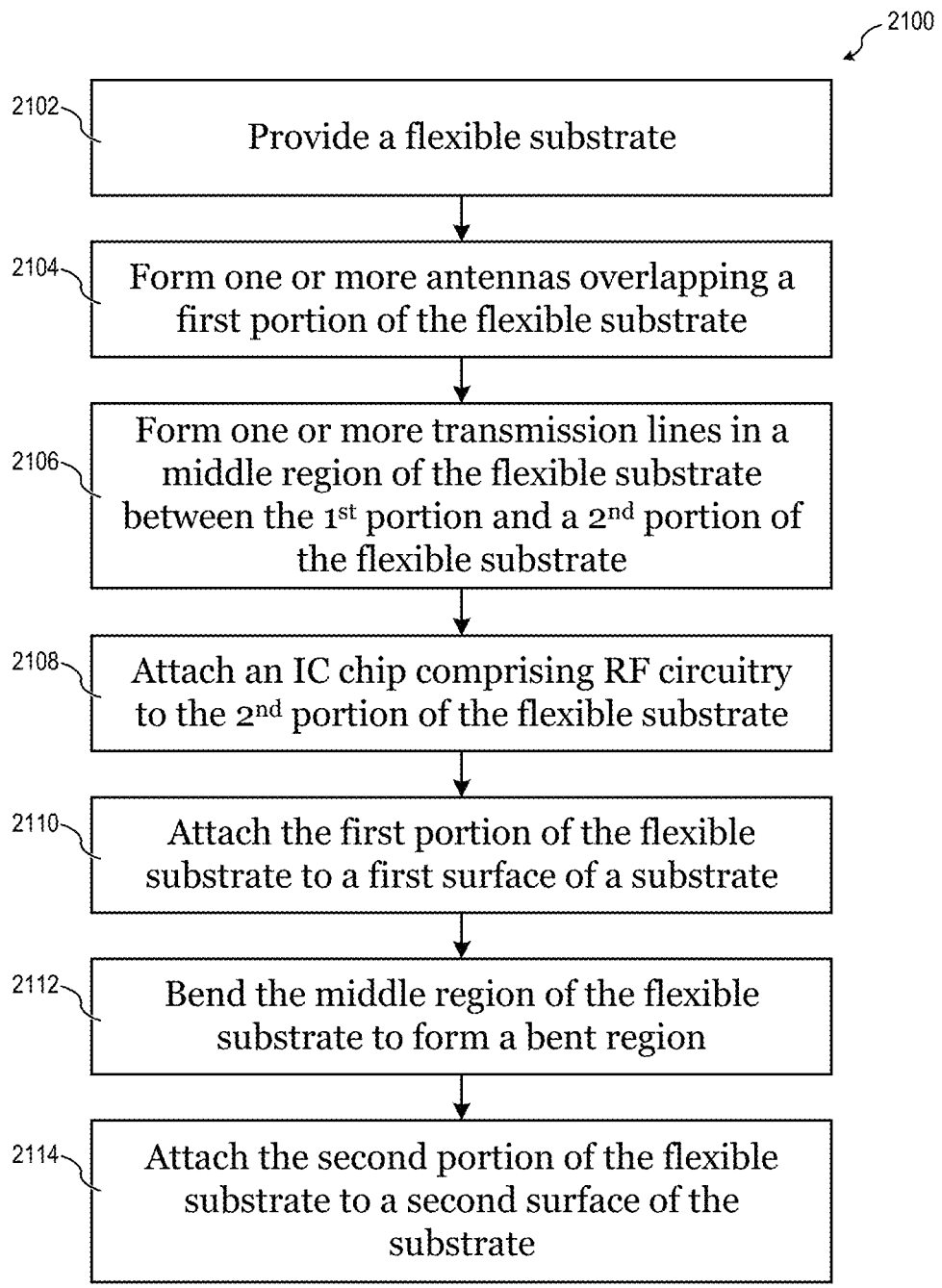
FIG. 21 illustrates a method of forming an RF system in accordance with an embodiment of the invention.

FIG. 21 illustrates a method of forming an RF system in accordance with an embodiment of the invention.

Referring to FIG. 21, a method 2100 of forming an RF system includes a step 2102 of providing a flexible substrate. The flexible substrate may include one or more conductive layers and one or more laminate layers and may be a flexible PCB in some embodiments. In one embodiment, the flexible substrate is a Pyralux® PCB. The method 2100 further includes a step 2104 of forming one or more antennas overlapping a first portion of the flexible substrate. For example, the antennas may be formed on a first portion of the flexible substrate by etching a conductive layer on a surface of the flexible substrate. Alternatively, there may be additional layers such as one or more transparent layers between the first portion of the flexible substrate and the antennas. In this case, the antennas may be formed on a surface of the additional layers overlapping the first portion of the flexible substrate. The antennas may be formed using any suitable method such as etching, lift-off, printing, and the like.

The method 2100 further includes a step 2106 of forming one or more transmission lines in a middle region of the flexible substrate between the first portion and a second portion of the flexible substrate. In configurations in which the antennas do not directly contact the flexible substrate, the transmission lines as well as additional circuitry may be formed in the middle region using any suitable method in a step 2106 separately from step 2104. Alternatively, step 2104 and step 2106 may be combined into a single step and the transmission lines, antennas, and other circuitry located on the flexible substrate may be formed in the same step. During step 2106 circuitry may also be formed at the second portion of the flexible substrate so that the second portion may be electrically coupled to additional circuitry located apart from the flexible substrate.

Still referring to FIG. 21, the method 2100 further includes a step 2108 of attaching an IC chip to the second portion of the flexible substrate. The IC chip may be attached using any suitable method such as a BGA using solder reflow process, for example. The method 2100 further includes a method 2110 of attaching the first portion of the flexible substrate to a first surface of another substrate. For example, the other substrate may be a planar substrate and may be RF-opaque. In one embodiment, the other substrate is an LCD screen and is configured to display an image by transmitting visible light on the same side as the antennas.

The method 2100 also includes a step 2112 of bending the middle region of the flexible substrate to form a bent region. For example, the bent region may allow the second portion of the flexible substrate to overlap with a second surface of the other substrate opposite the first surface. The bent region may allow the flexible substrate to be attached in a step 2114 of attaching the second portion of the flexible substrate to the second surface of the other substrate. In various embodiments, the IC chip overlapping the second surface is configured to process RF signals at the second surface that are transmitted and/or received by the antennas at the opposite first surface.

It should be noted that the above described steps may be omitted, combined and/or performed in a different order as may be desired to form a specific RF system as described herein. The above described steps may also be modified and additional steps may be added as would be apparent to those of ordinary skill in the art to suit a particular application. For example, steps of attaching a transparent substrate and a PCB overlapping the first and second surfaces of the other substrate respectively may be added when forming any of the RF systems including a transparent substrate and a PCB such as RF system 300.

Example embodiments of the present invention are summarized here. Other embodiments can also be understood from the entirety of the specification as well as the claims filed herein.

Example 1

A radio frequency (RF) system, including: a flexible substrate including a first portion overlapping a first surface of a substrate, the first surface being on a first side of the RF system, and a second portion overlapping a second surface of the substrate, the second surface being on a second side of the RF system; an antenna disposed over the first portion of the flexible substrate, the antenna being configured to transmit/receive RF signals on the first side of the RF system; and a transmission line disposed on a bent region of the flexible substrate between the first portion and the second portion, the transmission line being configured to propagate the RF signals between the first portion and the second portion on the second side of the RF system.

Example 2

The RF system of example 1, further including a transparent substrate disposed over the first surface of the substrate, wherein the antenna is disposed between the transparent substrate and the substrate, and the antenna is further configured to transmit/receive the RF signals through the transparent substrate.

Example 3

The RF system of example 1, further including a transparent substrate disposed over the first surface of the substrate, where the antenna is attached to a top surface of the transparent substrate, the transmission line overlaps with a bottom surface of the transparent substrate, the bottom surface being opposite of the top surface, and the antenna is electromagnetically coupled to the transmission line through the transparent substrate.

Example 4

The RF system of one of examples 1 to 3, wherein the substrate is opaque to the RF signals and is configured to transmit visible light at the first surface of the substrate.

Example 5

The RF system of one of examples 1 to 4, wherein the first surface is opposite of the second surface.

Example 6

The RF system of one of examples 1 to 4, wherein the first surface is at a substantially 90° angle relative to the second surface.

Example 7

The RF system of one of examples 1 to 6, further including: a printed circuit board disposed over the second surface of the substrate.

Example 8

The RF system of one of examples 1 to 7, further including: an integrated circuit (IC) chip attached to the second portion of the flexible substrate and operatively coupled to the antenna using the transmission line, the IC chip including RF circuitry configured to process the RF signals on the second side of the RF system.

Example 9

A method of fabricating a radio frequency (RF) system, the method including: forming an antenna overlapping a first portion of a flexible substrate; forming a transmission line on a middle region of the flexible substrate between the first portion and a second portion of the flexible substrate; attaching the first portion to a first surface of a substrate; bending the middle region of the flexible substrate to form a bent region of the flexible substrate; and attaching the second portion to a second surface of the substrate, wherein the antenna is configured to transmit/receive RF signals at the first surface, and the transmission line is configured to propagate the RF signals between the first portion and the second portion at the second surface of the substrate.

Example 10

The method of example 9, further including attaching a transparent substrate over the first surface of the substrate, wherein forming an antenna includes forming the antenna on the first portion of the flexible substrate between the transparent substrate and the substrate, and the antenna is further configured to transmit/receive the RF signals through the transparent substrate.

Example 11

The method of example 9, further including attaching a transparent substrate over the first surface of the substrate, wherein forming an antenna includes forming the antenna on a top surface of the transparent substrate, the transmission line overlaps with a bottom surface of the transparent substrate, the bottom surface being opposite of the top surface, and the antenna is electromagnetically coupled to the transmission line through the transparent substrate.

Example 12

The method of one of examples 9 to 11, wherein the substrate is opaque to the RF signals and is configured to transmit visible light at the first surface of the substrate.

Example 13

The method of one of examples 9 to 12, wherein the first surface is opposite of the second surface.

Example 14

The method of one of examples 9 to 12, wherein the first surface is at a substantially 90° angle relative to the second surface.

Example 15

The method of one of examples 9 to 14, further including attaching a printed circuit board over the second surface of the substrate.

Example 16

The method of one of examples 9 to 15, further including attaching an integrated circuit (IC) chip including RF circuitry to the second portion, the IC chip being operatively coupled to the antenna using the transmission line, wherein the RF circuitry is configured to process the RF signals at the second surface.

Example 17

A radio frequency (RF) device, including: an opaque substrate including a first surface and a second surface; a first substrate disposed over the first surface; a transparent substrate disposed over the first substrate; a first antenna integrated with the transparent substrate, the first antenna being configured to transmit/receive RF signals; an integrated circuit (IC) chip including RF circuitry configured to process the RF signals, wherein the IC chip is operatively coupled to the first antenna through an integrated region within the transparent substrate; a second substrate disposed over the second surface, the second substrate including electronic circuitry; and a flexible connector attached to the first substrate and the second substrate, the flexible connector being operatively coupled to the IC chip and to the electronic circuitry, wherein the first antenna communicates with the electronic circuitry through the IC chip using the flexible connector.

Example 18

The device of example 17, wherein the IC chip is integrated into the transparent substrate within the integrated region.

Example 19

The device of one of examples 17 and 18, further including a shaped transparent region disposed over the first antenna, the shaped transparent region being configured as an RF lens for the RF signals.

Example 20

The device of one of examples 17 to 19, further including a second antenna disposed at a bottom surface of the transparent substrate, wherein the first antenna is a parasitic antenna integrated at a top surface of the transparent substrate, and the second antenna is operatively coupled to the IC chip and electromagnetically coupled to the first antenna through the transparent substrate.

Example 21

The device of one of examples 17 to 20, wherein the first antenna is configured for cellular communication.

Example 22

The device of one of examples 17 to 20, wherein the first antenna is configured as a radar antenna.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A radio frequency (RF) device, comprising:
a display screen comprising a first side and an opposite second side, the display screen being configured to transmit visible light at the first side of the display screen;
a flexible substrate comprising a first portion overlapping the first side of the display screen, and a second portion overlapping the opposite second side of the display screen;
a plurality of antennas disposed over the first portion of the flexible substrate and the first side of the display screen, the plurality of antennas being configured to transmit/receive RF signals on the first side of the display screen, the display screen being opaque to the RF signals; and
a transmission line disposed on a bent region of the flexible substrate between the first portion and the second portion, the transmission line being configured to propagate the RF signals between the first portion and the second portion on the opposite second side of the display screen.

2. The RF device of claim 1, wherein the display screen is a liquid crystal display (LCD) screen.

3. The RF device of claim 1, wherein the plurality of antennas comprises a transmit antenna directly adjacent to a receive antenna, the transmit antenna and the receive antenna being configured as a bistatic radar system disposed in a central region of one end of the display screen.

4. The RF device of claim 1, wherein the plurality of antennas comprises a first antenna disposed at a first corner of the display screen and a second antenna disposed at a second corner of the display screen.

5. The RF device of claim 4, wherein the first antenna is a transmit antenna of a bistatic radar system and the second antenna is a receive antenna of the bistatic radar system.

6. The RF device of claim 5, wherein the plurality of antennas further comprises a third antenna disposed at a third corner of the display screen and a fourth antenna disposed at a fourth corner of the display screen.

7. The RF device of claim 1, further comprising an integrated circuit (IC) chip configured to non-coherently process the RF signals by individually processing the RF signals transmitted and received by each of the plurality of antennas.

8. The RF device of claim 1, further comprising an integrated circuit (IC) chip configured to coherently process the RF signals transmitted and received by each of the plurality of antennas as a unified radar system.

9. A radio frequency (RF) device, comprising:
a display screen comprising a first side and an opposite second side, the display screen being configured to transmit visible light to display an image in an image region of the display screen, the image region being at the first side of the display screen;
a transparent substrate disposed over and fully covering the first side of the display screen;
a communication antenna disposed over the first side of the display screen, the communication antenna being integrated with the transparent substrate and configured to transmit/receive RF signals on the first side of the display screen, the display screen being opaque to the RF signals; and
an integrated circuit (IC) chip overlapping the image region of the first side of the display screen, the IC chip being configured to process the RF signals.

10. The RF device of claim 9, further comprising:
a flexible substrate comprising a first portion overlapping the first side of the display screen, and a second portion overlapping a different side of the display screen; and
a printed circuit board (PCB) overlapping the opposite second side of the display screen, the PCB being electrically coupled to the IC chip using the flexible substrate.

11. The RF device of claim 9, wherein the communication antenna is etched onto a surface of the transparent substrate.

12. The RF device of claim 9, wherein the communication antenna is integrated within the transparent substrate.

13. The RF device of claim 9, wherein the communication antenna comprises multiple antenna regions configured for communication with networks using multiple communications standards.

14. The RF device of claim 9, wherein the communication antenna extends along two adjacent edges of the first side of the display screen.

15. The RF device of claim 14, wherein the communication antenna further extends along a third side of the display screen in a 'U'-shape.

16. The RF device of claim 15, wherein the communication antenna further extends around an entire border of the first side of the display screen.

17. The RF device of claim 9, wherein the IC chip is integrated within the transparent substrate.

18. A radio frequency (RF) device comprising:
- a display screen comprising a first side and an opposite second side, the display screen being configured to transmit visible light to display an image in an image region of the display screen, the image region being at the first side of the display screen;
- a transparent substrate disposed over and fully covering the first side of the display screen;
- a plurality of antennas disposed over the first side of the display screen, the plurality of antennas being configured to transmit/receive first RF signals on the first side of the display screen;
- a communication antenna disposed over the first side of the display screen, the communication antenna being integrated with the transparent substrate and configured to transmit/receive second RF signals on the first side of the display screen, the display screen being opaque to the first RF signals and the second RF signals; and
- an integrated circuit (IC) chip overlapping the image region of the first side of the display screen, the IC chip being configured to process the RF signals.

19. The RF device of claim 18, further comprising:
- a flexible substrate comprising a first portion disposed between the display screen and the transparent substrate, the first portion overlapping the first side of the display screen, and a second portion overlapping a different side of the display screen; and
- a printed circuit board (PCB) overlapping the opposite second side of the display screen, the PCB being electrically coupled to the IC chip using the flexible substrate.

20. The RF device of claim 18, wherein the communication antenna extends along three adjacent edges of the first side of the display screen in a 'U'-shape.

21. The RF device of claim 18, wherein the plurality of antennas comprises a transmit antenna directly adjacent to a receive antenna, the transmit antenna and the receive antenna being configured as a bistatic radar system disposed in a central region of one end of the display screen.

22. The RF device of claim 18, wherein the IC chip is integrated within the transparent substrate.

* * * * *